United States Patent
Tanaka et al.

(10) Patent No.: US 10,464,290 B2
(45) Date of Patent: Nov. 5, 2019

(54) PRESSURE-SENSITIVE ADHESIVE SHEET FOR TOUCH PANEL, LAMINATE FOR TOUCH PANEL, AND CAPACITANCE-TYPE TOUCH PANEL

(71) Applicant: FUJIFILM Corporation, Tokyo (JP)

(72) Inventors: Satoshi Tanaka, Ashigara-kami-gun (JP); Kenji Naoi, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 172 days.

(21) Appl. No.: 15/665,509

(22) Filed: Aug. 1, 2017

(65) Prior Publication Data
US 2017/0355173 A1  Dec. 14, 2017

Related U.S. Application Data

(63) Continuation of application No. PCT/JP2016/055556, filed on Feb. 25, 2016.

(30) Foreign Application Priority Data

Mar. 4, 2015 (JP) .................................. 2015-042336

(51) Int. Cl.
*B32B 7/12* (2006.01)
*G06F 3/044* (2006.01)
(Continued)

(52) U.S. Cl.
CPC .............. *B32B 7/12* (2013.01); *B32B 27/00* (2013.01); *B32B 27/30* (2013.01); *C09J 7/10* (2018.01);
(Continued)

(58) Field of Classification Search
CPC . B32B 2405/00; B32B 2457/20; B32B 27/00; B32B 27/30; B32B 7/12;
(Continued)

(56) References Cited

U.S. PATENT DOCUMENTS

| 2014/0134432 A1* | 5/2014 | Higashi | C09J 133/06 |
| | | | 428/355 AC |
| 2014/0248489 A1* | 9/2014 | Higashi | C09J 133/14 |
| | | | 428/355 AC |
| 2016/0002506 A1* | 1/2016 | Mitamura | C09J 133/08 |
| | | | 345/174 |

FOREIGN PATENT DOCUMENTS

| JP | 2012-140605 A | 7/2012 |
| JP | 2013-246535 A | 12/2013 |

(Continued)

OTHER PUBLICATIONS

U.S. Appl. No. 10/125,294, filed Nov. 2018, Mitamura; Yasuhiro.*
(Continued)

*Primary Examiner* — Afroza Chowdhury
(74) *Attorney, Agent, or Firm* — Sughrue Mion, PLLC

(57) ABSTRACT

An object of the present invention is to provide a pressure-sensitive adhesive sheet for a touch panel which is excellent for the operability of a capacitance-type touch panel, which is able to suppress the occurrence of malfunctions in a capacitance-type touch panel in a wide range of temperature environments from low temperatures to high temperatures, and which is also excellent in pressure-sensitive adhesion. In addition, another object of the present invention is to provide a laminate for a touch panel and a capacitance-type touch panel which include a pressure-sensitive adhesive sheet for a touch panel. In the pressure-sensitive adhesive sheet for a touch panel of the present invention, a relative dielectric constant obtained by impedance measurement at 1 MHz at 20° C. is 4.0 or more, a temperature dependency obtained from a temperature dependency evaluation test is 25% or less, and a 180 degree peel strength with respect to glass is 0.2 to 1.2 N/mm.

18 Claims, 6 Drawing Sheets

(51) Int. Cl.
*B32B 27/00* (2006.01)
*B32B 27/30* (2006.01)
*C09J 133/04* (2006.01)
*C09J 145/00* (2006.01)
*C09J 145/02* (2006.01)
*C09J 7/38* (2018.01)
*C09J 7/10* (2018.01)
*C09J 193/04* (2006.01)

(52) U.S. Cl.
CPC .............. *C09J 7/385* (2018.01); *C09J 133/04* (2013.01); *C09J 145/00* (2013.01); *C09J 145/02* (2013.01); *G06F 3/044* (2013.01); *B32B 2405/00* (2013.01); *B32B 2457/208* (2013.01); *C09J 193/04* (2013.01); *C09J 2201/36* (2013.01); *C09J 2201/622* (2013.01); *C09J 2203/318* (2013.01); *C09J 2433/00* (2013.01); *G06F 2203/04103* (2013.01)

(58) Field of Classification Search
CPC ....... C09J 121/00; C09J 133/04; C09J 145/00; C09J 145/02; C09J 193/04; C09J 2201/36; C09J 2201/622; C09J 2203/318; C09J 2433/00; C09J 7/10; C09J 7/385; G06F 2203/04103; G06F 3/044
See application file for complete search history.

(56) References Cited

FOREIGN PATENT DOCUMENTS

| WO | 2015/025803 A1 | 2/2015 |
|----|----------------|--------|
| WO | 2014132780 A1  | 2/2017 |

OTHER PUBLICATIONS

Notification of Reasons for Refusal, dated Nov. 6, 2018, in JP Application No. 2017-503439, 6 pages in English and Japanese.
International Search Report dated May 24, 2016, issued by the International Searching Authority in application No. PCT/JP2016/055556.
International Preliminary Report on Patentability and Written Opinion dated Sep. 5, 2017, issued by the International Searching Authority in application No. PCT/JP2016/055556.
Communication dated Sep. 27, 2018 from the Korean Intellectual Property Office in counterpart application No. 10-2017-7024387.

* cited by examiner

PRESSURE-SENSITIVE ADHESIVE SHEET FOR TOUCH PANEL, LAMINATE FOR TOUCH PANEL, AND CAPACITANCE-TYPE TOUCH PANEL

CROSS-REFERENCE TO RELATED APPLICATIONS

This application is a Continuation of PCT International Application No. PCT/JP2016/055556 filed on Feb. 25, 2016, which claims priority under 35 U.S.C. § 119(a) to Japanese Patent Application No. 2015-042336 filed on Mar. 4, 2015. The above application is hereby expressly incorporated by reference, in its entirety, into the present application.

BACKGROUND OF THE INVENTION

1. Field of the Invention

The present invention relates to a pressure-sensitive adhesive sheet for a touch panel, a laminate for a touch panel, and a capacitance-type touch panel.

2. Description of the Related Art

In recent years, the number of touch panels mounted on mobile phones, mobile game devices, and the like has increased, and for example, capacitance-type touch panels (also simply referred to below as a touch panel) capable of detecting multiple points have attracted attention.

Normally, in a case of manufacturing a touch panel, a pressure-sensitive adhesive sheet which is transparently viewable is used in order to bring each member such as a display device and a touch panel sensor into close contact, and various pressure-sensitive adhesive sheets have been proposed. For example, JP2012-140605A discloses a pressure-sensitive adhesive sheet having a relative dielectric constant of a predetermined value or more in order to suppress a decrease in detection sensitivity in a capacitance-type touch panel.

SUMMARY OF THE INVENTION

On the other hand, various characteristics are required for a pressure-sensitive adhesive sheet (pressure-sensitive adhesive layer) used for a touch panel. For example, from the viewpoint of the environmental adaptability of the touch panel, it is required that the touch panel including the pressure-sensitive adhesive sheet does not malfunction under various use environments such as cold climates and warm climates.

In addition, as described in JP2012-140605A described above, in order to suppress a decrease in detection sensitivity in a touch panel (in other words, in order to improve operability), there is a demand for a pressure-sensitive adhesive sheet with a high dielectric constant. Here, good operability means that the detection time in a case of touching the touch surface is short, and the position detection of the touched part is carried out immediately, while poor operability means that it takes time to detect the position of the touched part in a case of touching the touch surface.

Furthermore, the pressure-sensitive adhesive sheet used for the touch panel is required to have excellent pressure-sensitive adhesive strength.

In this manner, there is a demand for the pressure-sensitive adhesive sheets used for touch panels to have excellent pressure-sensitive adhesive strength, for the touch panel to not easily malfunction, and for the operability of the touch panel to not easily deteriorate. The present inventors examined the pressure-sensitive adhesive sheet as described in JP2012-140605A and found that all of the above three requirements were not satisfied and further improvement was necessary.

The present invention has been made in view of the above circumstances and has an object of providing a pressure-sensitive adhesive sheet for a touch panel which is excellent for the operability of a capacitance-type touch panel, which is able to suppress the occurrence of malfunctions in a capacitance-type touch panel in a wide range of temperature environments from low temperatures to high temperatures, and which is also excellent in adhesion.

In addition, another object of the present invention is to provide a laminate for a touch panel and a capacitance-type touch panel, which include the pressure-sensitive adhesive sheet for a touch panel described above.

The present inventors carried out intensive studies on the above problems and, as a result, found that it is possible to achieve the object described above using the following configurations.

[1] A pressure-sensitive adhesive sheet for a touch panel, in which a relative dielectric constant obtained by impedance measurement at 1 MHz at 20° C. is 4.0 or more, a temperature dependency obtained from a temperature dependency evaluation test described below is 25% or less, and a 180 degree peel strength with respect to glass is 0.2 to 1.2 N/mm. Temperature Dependency Evaluation Test: a pressure-sensitive adhesive sheet for a touch panel is interposed between aluminum electrodes, the temperature is raised from −10° C. to 40° C. at intervals of 10° C., the relative dielectric constant of the pressure-sensitive adhesive sheet for a touch panel is calculated using impedance measurement at 1 MHz at each temperature, the minimum value and the maximum value are selected from the calculated relative dielectric constant calculated at each temperature, and the value obtained from the expression [{(maximum value−minimum value)/minimum value}×100] (%) is taken as the temperature dependency.

[2] The pressure-sensitive adhesive sheet for a touch panel according to [1], comprising a first layer having a relative dielectric constant determined by impedance measurement at 1 MHz at 20° C. of 4.0 or more and a temperature dependency A of 25% or less, and a second layer having a relative dielectric constant determined by impedance measurement at 1 MHz at 20° C. of 4.0 or less and a temperature dependency B of 20% or less, in which the second layer is provided on both surfaces of the first layer, and the relative dielectric constant of the first layer at 20° C. is higher than the relative dielectric constant of the second layer at 20° C.

[3] The pressure-sensitive adhesive sheet for a touch panel according to [1] or [2], in which the temperature dependency is 20% or less.

[4] The pressure-sensitive adhesive sheet for a touch panel according to [2] or [3], in which a ratio of a thickness of the second layer with respect to a thickness of the first layer is 0.05 to 0.5.

[5] The pressure-sensitive adhesive sheet for a touch panel according to any one of [2] to [4], in which a glass transition temperature of the first layer is 0° C. or less.

[6] The pressure-sensitive adhesive sheet for a touch panel according to any one of [2] to [5], in which, in the temperature dependency evaluation test, in a case where the first layer is used instead of the pressure-sensitive adhesive sheet for a touch panel, a maximum value of the relative dielectric constant of the first layer is in a range of −10° C. to 40° C.

[7] The pressure-sensitive adhesive sheet for a touch panel according to any one of [2] to [6], in which the first layer includes a (meth)acrylic resin and the (meth)acrylic resin has a repeating unit derived from a monomer having at least one group selected from a group consisting of a hydroxyl group, a nitrogen-containing functional group, and a carboxyl group, and the monomer is used in an amount of 10% by mass or more with respect to 100% by mass of the monomer total mass used for polymerization of the (meth) acrylic resin.

[8] The pressure-sensitive adhesive sheet for a touch panel according to any one of [2] to [7], in which the second layer includes a (meth)acrylic resin and a hydrophobic compound.

[9] The pressure-sensitive adhesive sheet for a touch panel according to [8], in which the hydrophobic compound included in the second layer includes at least one resin selected from a group consisting of a terpene-based resin, a rosin-based resin, a coumarone indene-based resin, a rubber-based resin, and a styrene-based resin.

[10] The pressure-sensitive adhesive sheet for a touch panel according to [8] or [9], in which a content of the hydrophobic compound is 20% to 80% by mass with respect to the second layer total mass, and is 1% to 30% by mass with respect to the pressure-sensitive adhesive sheet for a touch panel total mass.

[11] A laminate for a touch panel comprising the pressure-sensitive adhesive sheet for a touch panel according to any one of [1] to [10], and a capacitance-type touch panel sensor.

[12] The laminate for a touch panel according, to [11], further comprising a protective substrate, in which the capacitance-type touch panel sensor, the pressure-sensitive adhesive sheet for a touch panel, and the protective substrate are in this order.

[13] A capacitance-type touch panel comprising at least a display device, the pressure-sensitive adhesive sheet for a touch panel according to any one of [1] to [10], and a capacitance-type touch panel sensor, in this order.

According to the present invention, it is possible to provide a pressure-sensitive adhesive sheet for a touch panel which is excellent for the operability of a capacitance-type touch panel, which is able to suppress the occurrence of malfunctions in a capacitance-type touch panel in a wide range of temperature environments from low temperatures to high temperatures, and which is also excellent in pressure-sensitive adhesion.

DESCRIPTION OF THE PREFERRED EMBODIMENTS

Figure 1:
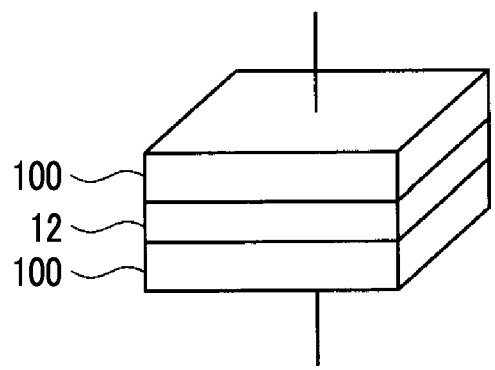
FIG. 1 is a schematic view of a sample for evaluation used in a temperature dependency evaluation test.

A detailed description will be given below of a pressure-sensitive adhesive sheet for a touch panel (also simply referred to below as "pressure-sensitive adhesive sheet") of the present invention.

Here, in the present specification, the term "(meth)acrylic resin" means acrylic resin and/or methacrylic resin. In addition, (meth)acrylate monomer means acrylate monomer and/or methacrylate monomer. Here, monomer is synonymous with monomer.

Here, in the present specification, a numerical range expressed by using "to" means a range including the numerical values described before and after "to" as a lower limit value and an upper limit value.

[Pressure-Sensitive Adhesive Sheet for Touch Panel (Pressure-Sensitive Adhesive Sheet)]

The pressure-sensitive adhesive sheet of the present invention is a sheet for ensuring adhesion between members. In particular, the pressure-sensitive adhesive sheet of the present invention is suitably used for touch panel applications as described below.

As a result of intensive studies, the inventors of the present invention found that setting each characteristic of the relative dielectric constant, temperature dependency, and 180 degree peel strength of the pressure-sensitive adhesive sheet as a specific value makes the operability of the capacitance-type touch panel excellent, makes it possible to suppress the occurrence of malfunctions of the capacitance-type touch panel in a wide range of temperature environments from low temperatures to high temperatures, and also makes the pressure-sensitive adhesion excellent.

First, a detailed description will be given of characteristics of the pressure-sensitive adhesive sheet of the present invention.

<Characteristics of Pressure-Sensitive Adhesive Sheet>

In the pressure-sensitive adhesive sheet of the present invention, the relative dielectric constant obtained by impedance measurement at 1 MHz at 20° C. is 4.0 or more, and the temperature dependency obtained from a temperature dependency evaluation test described below is 25% or less, and the 180 degree peel strength with respect to glass is 0.2 to 1.2 N/mm.

Here, in this specification, the "relative dielectric constant obtained by impedance measurement at 1 MHz at 20° C." may be abbreviated simply as "relative dielectric constant at 20° C.".

(Temperature Dependency of Pressure-Sensitive Adhesive Sheet)

The pressure-sensitive adhesive sheet of the present invention has a temperature dependency (temperature dependency of relative dielectric constant) obtained from a temperature dependency evaluation test described below of 25% or less, preferably 20% or less, more preferably 15% or less, and particularly preferably 10% or less. The lower limit is not particularly limited, but the lower the lower limit, the more preferable, and 0% is the most preferable. The temperature dependency of the pressure-sensitive adhesive sheet being 25% or less suppresses the occurrence of malfunctions of the touch panel.

On the other hand, in a case where the temperature dependency of the pressure-sensitive adhesive sheet exceeds 25%, malfunctions occur in the touch panel.

Detailed description will be given below of a method for carrying out the temperature dependency evaluation test. Here, the measurement of the relative dielectric constant which uses an impedance measurement technique at each temperature and which will be described below is generally known as a capacitance method. Conceptually, the capacitance method is a method for forming a capacitor by interposing a sample between electrodes and calculating the dielectric constant from the measured capacitance value. In addition, since electronic equipment such as touch panels is inevitably used outside along with growth of the "ubiquitous society" which is developing along with the mobilization of electronic equipment on which capacitance-type touch panels are mounted, the environmental temperatures to which the electronic equipment is exposed were assumed to be −10° C. to 40° C. and, in the present evaluation test, the test environments were −10° C. to 40° C.

First, as shown in FIG. 1, a pressure-sensitive adhesive sheet 12 (thickness: 100 to 500 μm) to be measured is interposed between a pair of aluminum electrodes 100 (electrode area: 20 mm×20 mm), and subjected to a pressure defoaming treatment at 40° C. and 5 atm for 60 minutes to produce a sample for evaluation.

Thereafter, the temperature of the pressure-sensitive adhesive sheet in the sample is gradually increased from −10° C. to 40° C. at intervals of 10° C., and the impedance at 1 MHz is measured using an impedance analyzer (Agilent Technologies, 4294 A) for each temperature to obtain a capacitance C. Thereafter, after multiplying the obtained capacitance C by a thickness T of the pressure-sensitive adhesive sheet, the obtained value is divided by the product of an area S of the aluminum electrode and the dielectric constant ε0 of a vacuum (8.854×10−12 F/m) to calculate the relative dielectric constant. That is, the relative dielectric constant is calculated by equation (X): relative dielectric constant=(capacitance C×thickness T)/(area S×dielectric constant in vacuum ε0).

More specifically, the temperature of the pressure-sensitive adhesive sheet is raised in intervals such that the temperature of the pressure-sensitive adhesive sheet becomes −10° C., 0° C., 10° C., 20° C., 30° C., and 40° C., and the temperature of the pressure-sensitive adhesive sheet is left for 5 minutes to stabilize at each temperature, then the capacitance C is obtained by impedance measurement at 1 MHz at that temperature and the relative dielectric constant at each temperature is calculated from the obtained value.

Here, the thickness of the pressure-sensitive adhesive sheet is a value obtained by measuring the thicknesses of the pressure-sensitive adhesive sheets at arbitrary points of at least 5 places and arithmetically averaging the results.

Thereafter, the minimum value and the maximum value are selected from the calculated relative dielectric constant, and the ratio of the difference between the two to the minimum value is obtained. More specifically, a value (%) calculated from the equation [{(maximum value−minimum value)/minimum value}×100] is obtained, and this value is taken as the temperature dependency.

Figure 2:
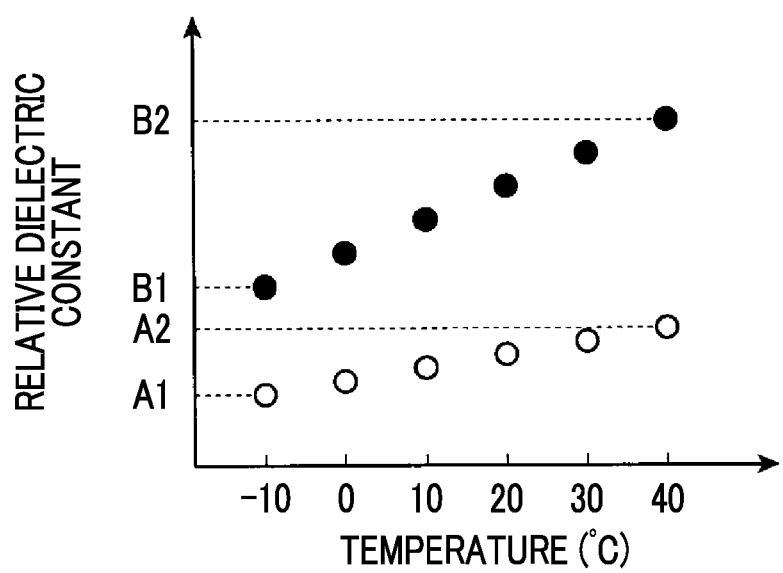
FIG. 2 shows an example of a result of the temperature dependency evaluation test.

FIG. 2 shows an example of the result of the temperature dependency evaluation test. In FIG. 2, the horizontal axis represents the temperature and the vertical axis represents the relative dielectric constant. In addition, FIG. 2 shows an example of measurement results of two kinds of pressure-sensitive adhesive sheets, one being indicated by white circles and the other by black circles.

Referring to FIG. 2, in the pressure-sensitive adhesive sheet A indicated by white circles, the relative dielectric constant at each temperature is relatively close, and the changes thereof are also small. In other words, the relative dielectric constant of the pressure-sensitive adhesive sheet A shows that the change due to temperature is small, and the relative dielectric constant of the pressure-sensitive adhesive sheet A does not easily change even in cold climates and warm climates. As a result, in the touch panel including the pressure-sensitive adhesive sheet A, the capacitance between the detection electrodes is hardly shifted from the initially set value, and malfunctions hardly occur. It is possible to obtain the temperature dependency (%) of the pressure-sensitive adhesive sheet A by selecting the minimum value A1 and the maximum value A2 of the white circle in FIG. 2, and using the expression [(A2−A1)/A1× 100].

On the other hand, in the pressure-sensitive adhesive sheet B indicated by the black circles, as the temperature rises, the relative dielectric constant greatly increases, and the change thereof is large. That is, the relative dielectric constant of the pressure-sensitive adhesive sheet B exhibits a large change due to temperature, and the capacitance between the detection electrodes easily shifts from the initially set value, and malfunctions easily occur. Here, it is possible to obtain the temperature dependency (%) of the pressure-sensitive adhesive sheet B by selecting the minimum value B1 and the maximum value B2 of the black circles in FIG. 2, and using the expression [(B2−B1)/B1× 100].

That is, the temperature dependency described above indicates the degree of the change in the dielectric constant due to temperature, and when this value is small, the relative dielectric constant hardly changes from a low temperature (−10° C.) to a high temperature (40° C.). On the other hand, when this value is large, changes in the relative dielectric constant easily occur from a low temperature (−10° C.) to a high temperature (40° C.).

In general, in a case where an insulator is present between conductors such as electrodes, the capacitance C of the insulator between the electrodes is given by the capacitance C=dielectric constant ε×area S/layer thickness T, and dielectric constant ε=relative dielectric constant $\varepsilon_r$×vacuum dielectric constant $\varepsilon_0$.

(Relative Dielectric Constant of Pressure-Sensitive Adhesive Sheet)

The relative dielectric constant of the pressure-sensitive adhesive sheet of the present invention, which is obtained by impedance measurement at 1 MHz at 20° C., is 4.0 or more, preferably 4.5 to 9.0, more preferably 5.0 to 8.5, and particularly preferably 5.5 to 8.0. In this manner, by the value of the relative dielectric constant of the pressure-sensitive adhesive sheet being 4.0 or more, the sensitivity of the touch panel is good and the operability is improved. In addition, setting the relative dielectric constant of the pressure-sensitive adhesive sheet to 9.0 or less makes it possible to reduce the parasitic capacitance of the pressure-sensitive adhesive sheet and the temperature dependency of the touch panel is easily lowered, thus it is possible to further suppress the occurrence of malfunctions.

On the other hand, in a case where the relative dielectric constant of the pressure-sensitive adhesive sheet is less than 4.0, the sensitivity of the touch panel decreases and the operability deteriorates.

In the present invention, the relative dielectric constant of the pressure-sensitive adhesive sheet is obtained by impedance measurement at 1 MHz at 20° C. and is obtained in the same manner in as the procedure of the temperature dependency evaluation test.

(180 Degree Peel Strength of Pressure-Sensitive Adhesive Sheet)

The 180 degree peel strength of the pressure-sensitive adhesive sheet of the present invention is 0.2 to 1.2 N/mm, preferably 0.3 to 1.1 N/mm, more preferably 0.4 to 1.0 N/mm, and particularly preferably 0.5 to 0.9 N/mm.

When the peel strength is in the range described above, in a case of using a pressure-sensitive adhesive sheet between a capacitance-type touch panel sensor and a protective substrate (cover member), between a capacitance-type touch panel sensor and a display device, or between a substrate in a capacitance-type touch panel sensor and conductive films including detection electrodes arranged on the substrate, excellent adhesion retention (pressure-sensitive adhesion) is maintained in a wide temperature region and malfunctions do not easily occur in the touch panel due to changes over time or the like.

As a measurement method of the pressure-sensitive adhesion evaluation test, a pressure-sensitive adhesive sheet was laminated on a glass substrate and a 180 degree peel strength is determined by a method in accordance with "10.4 Measurement of Peel Adhesion" in JIS Z 0237 for pressure-sensitive adhesive sheets.

More specifically, the pressure-sensitive adhesive sheet (width 25 mm×length 40 mm to 50 mm) was placed such that the pressure-sensitive adhesive surface of the pressure-sensitive adhesive sheet faced the glass plate in the vicinity of the center of the glass plate (40 mm or more×60 mm or more) and laminated at 10 to 40 kPa such that the longitudinal directions of the pressure-sensitive adhesive sheet and the glass plate are aligned. Thereafter, the longitudinal directions of the KAPTON film (width 25 mm×length 150 mm or more) was aligned on the exposed pressure-sensitive adhesive sheet and the KAPTON film and the pressure-sensitive adhesive sheet are bonded to each other to obtain a laminate such that one end of the KAPTON film does not come into contact with the pressure-sensitive adhesive sheet and the entire region of the pressure-sensitive adhesive sheet is covered with the KAPTON film to obtain a laminate. Next, one end of the KAPTON film which is not in contact with the pressure-sensitive adhesive sheet in an AUTOGRAPH (manufactured by Shimadzu Corporation) is set in a shape pulled (peeled) in the 180 degree direction and the peel strength is measured.

(Other Characteristics)

The thickness of the pressure-sensitive adhesive sheet of the present invention is not particularly limited, but is preferably 5 to 2500 µm, and more preferably 20 to 500 µm. It is possible to obtain the desired visible light transmittance within the ranges described above and the handling is also easy. It is possible to measure the thickness of the pressure-sensitive adhesive sheet in the present invention using, for example, a micrometer.

The pressure-sensitive adhesive sheet is preferably optically transparent. That is, the pressure-sensitive adhesive sheet is preferably a transparent pressure-sensitive adhesive sheet. Optically transparent means that the total light transmittance is 85% or more, preferably 90% or more, more preferably 95% or more. It is possible to measure the total light transmittance using an integrating sphere-type light transmittance measuring apparatus (for example, trade name "CM-3600 A" manufactured by Konica Minolta, Inc.).

<Composition of Pressure-Sensitive Adhesive Sheet>

The manufacturing method of the pressure-sensitive adhesive sheet described above is not particularly limited, and it is possible to manufacture the pressure-sensitive adhesive sheet by a known method. Examples thereof include a method in which a pressure-sensitive adhesive composition (also simply referred below to as "composition") is coated onto a predetermined base material (for example, a peeling sheet) and a curing treatment is carried out as necessary to form a pressure-sensitive adhesive sheet. After the formation of the pressure-sensitive adhesive sheet, as necessary, the peeling sheet may be laminated on the exposed surface of the formed pressure-sensitive adhesive sheet.

A detailed description will be given below of a method using a pressure-sensitive adhesive composition as a method of forming a pressure-sensitive adhesive sheet. One of the pressure-sensitive adhesive composition A and the pressure-sensitive adhesive composition B, which are examples of the pressure-sensitive adhesive composition described below, may be used or both may be used; however, it is preferable to use the pressure-sensitive adhesive composition A alone or to use both the pressure-sensitive adhesive composition A and the pressure-sensitive adhesive composition B, and it is more preferable to use both the pressure-sensitive adhesive composition A and the pressure-sensitive adhesive composition B.

<Pressure-sensitive adhesive composition A>

The pressure-sensitive adhesive composition A contains a (meth)acrylic resin ((meth)acrylic polymer) having a repeating unit derived from a specific monomer A described below as a component imparting pressure-sensitive adhesion to the pressure-sensitive adhesive sheet. That is, the pressure-sensitive adhesive sheet formed using the pressure-sensitive adhesive composition A includes a (meth)acrylic resin having a repeating unit derived from the specific monomer A.

In this manner, having the repeating unit derived from the specific monomer A makes it possible to further improve the relative dielectric constant of the pressure-sensitive adhesive sheet.

Here, the "specific monomer A" refers to a monomer having at least one group selected from the group consisting of a hydroxyl group, a carboxyl group, and a nitrogen-containing functional group. Examples of nitrogen-containing functional groups include an amino group, an amide group, an imide group, a urea group, a tertiary amino group, an ammonium group, an amidino group, a triazine ring, a triazole ring, a benzotriazole group, an imidazole group, a benzimidazole group, a quinoline group, a pyridine group, a pyrimidine group, a pyrazine group, a quinazoline group, a quinoxaline group, a purine group, a triazine group, a piperidine group, a piperazine group, a pyrrolidine group, a pyrazole group, an aniline group, a group including an alkylamine structure, a group including an isocyanur structure, a nitro group, a nitroso group, an azo group, a diazo group, an azide group, a cyano group, a cyanate group (R—O—CN), a morpholine group, a lactam group, and the like.

Examples of the specific monomer A include (meth)acrylic acid, 2-hydroxyethyl (meth)acrylate, 3-hydroxypropyl (meth)acrylate, 4-hydroxybutyl (meth)acrylate, 6-hydroxyhexyl (meth)acrylate, 8-hydroxy-octyl (meth)acrylate, 10-hydroxydecyl (meth)acrylate, 12-hydroxylauryl (meth)acrylate N,N-dimethyl (meth)acrylamide, N,N-diethyl (meth)acrylamide, N-t-butyl (meth)acrylamide, N,N-isopropyl (meth)acrylamide, N-t-octyl (meth)acrylamide, N,N-dimethylaminoethyl (meth)acrylamide, N,N-dimethylaminopropyl (meth)acrylamide, diacetone acrylamide, (meth)acryloyl morpholine, N-vinylpyrrolidone, N-vinylcaprolactam, and the like. These monomers may be used alone as one kind or in a combination of two or more kinds.

The specific monomer A used for such polymerization of the (meth)acrylic resin is preferably 10% by mass or more with respect to 100% by mass of the total mass of the monomers (monomers) used in the polymerization of the (meth)acrylic resin, more preferably 10% to 50% by mass or more, and particularly preferably 15% to 30% by mass or more. The usage amount of the specific monomer A being 10% by mass or more makes it possible to further improve the relative dielectric constant of the pressure-sensitive adhesive sheet. In addition, the usage amount of the specific monomer A being 50% by mass or less makes it possible to suppress an increase in the temperature dependency and there is a tendency to be able to further reduce malfunctions.

In the polymerization of the (meth)acrylic resin, it is preferable to further use the following (meth)acrylate monomers.

Specific examples of (meth)acrylate monomers include hexyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, n-tridecyl (meth)acrylate, n-tetradecyl (meth)acrylate, n-hexadecyl (meth)acrylate, stearyl (meth)acrylate, cyclohexyl (meth)acrylate, benzyl (meth)acrylate, isobornyl (meth)acrylate, dicyclopentenyl (meth)acrylate, dicyclopentanyl (meth)acrylate, dicyclopentenyloxyethyl (meth)acrylate, and the like. Among the (meth)acrylate monomers described above, from the viewpoint of improving the pressure-sensitive adhesion, it is preferable to have a (meth)acrylate monomer having a hydrocarbon group (preferably an aliphatic hydrocarbon group) having 4 to 20 carbon atoms (preferably 6 to 18 carbon atoms), and it is more preferable to use a (meth)acrylate monomer having a chain aliphatic hydrocarbon group such as hexyl (meth)acrylate and 2-ethylhexyl (meth)acrylate. These monomers may be used alone as one kind or in a combination of two or more kinds.

The (meth)acrylate monomer having a hydrocarbon group having 4 to 20 carbon atoms is preferably used in the range of 25% to 90% by mass with respect to 100% by mass of the total mass of the monomers (monomers) used in the polymerization of the (meth)acrylic resin, and more preferably used in the range of 40% to 80% by mass. Due to this, there is a tendency for increased pressure-sensitive adhesion to be exhibited.

From the viewpoint that the glass transition temperature (Tg) of the pressure-sensitive adhesive is easily designed and the relative dielectric constant of the (meth)acrylic resin is easily adjusted, the (meth)acrylic resin is preferably polymerized using at least the (meth)acrylate monomer having a hydrocarbon group having 4 to 20 carbon atoms described above and the specific monomer A described above.

Here, the (meth)acrylic resin may include a repeating unit derived from a monomer (also referred to below as "other monomers") other than those described above as long as the effect of the present invention is not impaired. In addition, one kind of (meth)acrylic resin may be used, or two or more kinds may be used in combination.

Examples of other monomers include benzyl (meth)acrylate, phenoxyethyl (meth)acrylate, butoxyethylene glycol (meth)acrylate, butoxydiethylene glycol (meth)acrylate, methoxytriethylene glycol (meth)acrylate, tetrahydrofurfuryl (meth)acrylate, tetraethylene glycol monomethyl ether (meth)acrylate, hexaethylene glycol monomethyl ether (meth)acrylate, octaethylene glycol monomethyl ether (meth)acrylate, nonaethylene glycol methyl ether (meth)acrylate, heptapropylene glycol monomethyl ether (meth)acrylate, tetraethylene glycol ethyl ether (meth)acrylate, tetraethylene glycol mono (meth)acrylate, hexaethylene glycol mono (meth)acrylate, octapropylene glycol mono (meth)acrylate, glycidyl (meth)acrylate, 4-hydroxybutyl (meth)acrylate glycidyl ether, 3,4-epoxy cyclohexyl methyl (meth)acrylate, and the like. These monomers may be used alone as one kind or in a combination of two or more kinds.

Furthermore, the (meth)acrylic resin may have a cross-linked structure. A method for forming a cross-linked structure is not particularly limited, and examples thereof include a method using a bifunctional (meth)acrylate monomer, a method of introducing a reactive group (for example, a hydroxyl group) into a (meth)acrylic polymer and carrying out a reaction with a cross-linking agent reacting with the reactive group, and the like.

For example, it is possible to use an isocyanate-based cross-linking agent and/or an epoxy-based cross-linking agent as the cross-linking agent which reacts with the reactive group described above. The isocyanate-based cross-linking agent and the epoxy-based cross-linking agent are not particularly limited and it is possible to appropriately use known cross-linking agents.

Examples of the isocyanate-based cross-linking agent include 2,4-tolylene diisocyanate, 2,6-tolylene diisocyanate, hydrogenated tolylene diisocyanate, 1,3-xylylene diisocyanate, 1,4-xylylene diisocyanate, hexamethylene diisocyanate, diphenylmethane-4,4-diisocyanate, isophorone diisocyanate, 1,3-bis(isocyanatomethyl) cyclohexane, tetramethylxylylene diisocyanate, 1,5-naphthalene diisocyanate, triphenylmethane triisocyanate, adducts of these polyisocyanate compounds and polyol compounds such as trimethylol propane, biurets or isocyanurates of these polyisocyanate compounds, and the like. Among the isocyanate-based cross-linking agents, 2,4-tolylene diisocyanate, 2,6-tolylene diisocyanate, 1,3-xylylene diisocyanate, 1,4-xylylene diisocyanate, hexamethylene diisocyanate, and isophorone diisocyanate are preferable from the viewpoint of the dielectric constant of the pressure-sensitive adhesive sheet, and hexamethylene diisocyanate and isophorone diisocyanate are more preferable from the viewpoint of coloring over time.

Examples of epoxy-based cross-linking agent include bisphenol A epichlorohydrin-type epoxy resins, ethylene glycol diglycidyl ether, polyethylene glycol diglycidyl ether, glycerin diglycidyl ether, glycerin triglycidyl ether, 1,6-hexanediol diglycidyl ether, trimethylolpropane triglycidyl ether, sorbitol polyglycidyl ether, polyglycerol polyglycidyl ether, pentaerythritol polyglycidyl erythritol, diglycerol polyglycidyl ether, and the like. Among the epoxy-based cross-linking agents, ethylene glycol diglycidyl ether, polyethylene glycol diglycidyl ether, 1,6-hexanediol diglycidyl ether, and trimethylolpropane triglycidyl ether are preferable from the viewpoint of the flexibility of the pressure-sensitive adhesive layer, and 1,6-hexanediol diglycidyl ether and trimethylolpropane triglycidyl ether are more preferable from the viewpoint of the dielectric constant.

The amount of the isocyanate-based cross-linking agent and the epoxy cross-linking agent to be used is not particularly limited, but is preferably 0.3% to 10% by mass with respect to the total solid content (100% by mass) of the pressure-sensitive adhesive composition A, and, from the viewpoint of compatibility of flexibility and pressure-sensitive adhesion of the pressure-sensitive adhesive sheet, more preferably 0.5 to 7% by mass, and even more preferably 1 to 5% by mass.

These cross-linking agents may be used alone, or two or more kinds may be used in combination.

As a cross-linking agent for cross-linking (meth)acrylic polymer ((meth)acrylic polymer) used in the (meth)acrylic resin, it is possible to use a polyfunctional (meth)acrylate monomer having two or more (meth)acryloyl groups.

The difunctional (meth)acrylate monomer may be a monomer containing two (meth)acryloyl groups, and examples thereof include ethylene glycol di(meth)acrylate, diethylene glycol di(meth)acrylate, tetraethylene glycol di(meth)acrylate, propylene glycol di(meth)acrylate, propylene glycol di(meth)acrylate, dipropylene glycol di(meth)acrylate, polypropylene glycol di(meth)acrylate, neopentyl glycol di(meth)acrylate, ethylene oxide-modified bisphenol A di(meth)acrylate, propylene oxide-modified bisphenol A di(meth)acrylate, 1,3-butanediol di(meth)acrylate, 1,4-butanediol di(meth)acrylate, 1,6-hexanediol di(meth)acrylate, 1,6-hexanediol ethylene oxide modified di(meth)acrylate, 1,9-nonanediol di(meth)acrylate, 1,10-decanediol di(meth)acrylate, glycerine di(meth)acrylate, pentaerythritol di(meth)acrylate, ethylene glycol diglycidyl ether di(meth)acrylate, diethylene glycol diglycidyl ether di(meth)acrylate, phthalic acid diglycidyl ester di(meth)acrylate, hydroxypivalic acid-modified neopentyl glycol di(meth)acrylate, isocyanuric acid ethylene oxide-modified diacrylate, 2-(meth)acryloyloxyethyl acid phosphate diester, and the like.

The trifunctional or higher (meth)acrylate-based monomer may be a monomer containing three or more (meth)acryloyl groups, and examples thereof include trimethylolpropane tri (meth)acrylate, pentaerythritol tri (meth)acrylate, pentaerythritol tetra(meth)acrylate, dipentaerythritol tri (meth)acrylate, dipentaerythritol tetra(meth)acrylate, dipentaerythritol penta(meth)acrylate, dipentaerythritol hexa(meth)acrylate, tri(meth)acryloyloxyethoxytrimethylol propane, glycerin polyglycidyl ether poly(meth)acrylate, isocyanuric acid ethylene oxide-modified-tri(meth)acrylate, ethylene oxide-modified dipentaerythritol penta(meth)acrylate, ethylene oxide-modified dipentaerythritol hexa(meth)acrylate, ethylene oxide-modified pentaerythritol tri (meth)acrylate, ethylene oxide-modified pentaerythritol tetra(meth)acrylate, and succinic acid-modified pentaerythritol tri (meth)acrylate, and the like.

Among the polyfunctional (meth)acrylate monomers described above, from the viewpoint of the flexibility of the pressure-sensitive adhesive layer, diethylene glycol di(meth)acrylate, tetraethylene glycol di(meth)acrylate, polyethylene glycol di(meth)acrylate, polypropylene glycol di(meth)acrylate, 1,6-hexanediol di(meth)acrylate, 1,9-nonanediol di(meth)acrylate, and 1,10-decanediol di(meth)acrylate are preferable, and from the viewpoint of reducing the dielectric constant, polypropylene glycol di(meth)acrylate, 1,6-hexanediol di(meth)acrylate, 1,9-nonanediol di(meth)acrylate, and 1,10-decanediol di(meth)acrylate are more preferable.

The usage amount of the polyfunctional (meth)acrylate monomer is not particularly limited, but is preferably 0 to 5% by mass with respect to the total solid content (100% by mass) of the pressure-sensitive adhesive composition A, more preferably 0.01 to 2% by mass, from the viewpoint of compatibility between flexibility and pressure-sensitive adhesion in the pressure-sensitive adhesive layer, even more preferably 0.02 to 1% by mass, and most preferably 0.05 to 0.5% by mass.

These polyfunctional (meth)acrylate monomers may be used alone, or two or more kinds may be used in combination.

The polymerization method of the (meth)acrylic resin is not particularly limited, and polymerization is possible by a known method such as solution polymerization, emulsion polymerization, bulk polymerization, suspension polymerization, or alternating copolymerization. In addition, the copolymer to be obtained may be any of a random copolymer, a block copolymer, or the like.

The weight average molecular weight of the (meth)acrylic resin is preferably 100,000 to 2,500,000, more preferably 200,000 to 2,000,000, and even more preferably 400,000 to 1,500,000.

Here, the weight average molecular weight of each component in the present invention is a value obtained by measuring by gel permeation chromatography (GPC) measurement in terms of polystyrene.

More specifically, the weight average molecular weight is measured under the following conditions using gel permeation chromatography (GPC).
Apparatus: EcoSEC HLC-8320 GPC manufactured by Tosoh Corporation Column: TSK-GEL
SuperHZM-H manufactured by Tosoh Corporation
TSK-GEL SuperHZ 4000 manufactured by Tosoh Corporation
TSK-GEL SuperHZ 2000 manufactured by Tosoh Corporation Column temperature: 40° C.
Flow rate: 0.35 mL/min
Calibration curve: TSKstandard POLYSTYRENE manufactured by Tosoh Corporation
Eluent: THF (containing a stabilizer) manufactured by Wako Pure Chemical Industries, Ltd.

The pressure-sensitive composition A may include a solvent as necessary. Examples of the solvents to be used include water, organic solvents (for example, alcohols such as methanol, ketones such as acetone, amides such as formamide, sulfoxides such as dimethyl sulfoxide, esters such as ethyl acetate, ethers, and the like), or a mixed solvent thereof.

In addition to the above, in the pressure-sensitive adhesive composition A, it is possible to appropriately add various kinds of additives known in the art such as a polymerization initiator (for example, a theinial radical polymerization initiator, a photoradical polymerization initiator, a thermal cationic polymerization initiator, a photocationic polymerization initiator, and the like), a surface lubricant, a leveling agent, an antioxidant, a corrosion inhibitor, a light stabilizer, an ultraviolet absorber, a polymerization inhibitor, a silane coupling agent, an inorganic or organic filler, and powders such as metal powder and pigments, and particulates or foils, according to the use application.

From the viewpoint of further improving the relative dielectric constant of the pressure-sensitive adhesive sheet, the pressure-sensitive adhesive composition A preferably substantially does not contain the hydrophobic compound described in the description of the pressure-sensitive adhesive composition B described below.

Here, "substantially does not contain" means to the extent that a compound is not intentionally added at the time of producing the pressure-sensitive adhesive composition B, and includes cases where a compound is inevitably incorporated during manufacturing.

<Pressure-sensitive Adhesive Composition B>

The pressure-sensitive adhesive composition B contains a (meth)acrylic resin ((meth)acrylic-based polymer) as a component imparting pressure-sensitive adhesion to the pressure-sensitive adhesive sheet and a hydrophobic compound. That is, the pressure-sensitive adhesive sheet formed by using the pressure-sensitive adhesive composition B includes the (meth)acrylic resin and the hydrophobic compound.

In the pressure-sensitive adhesive composition B, the (meth)acrylate monomer ((meth)acrylate monomer) used for polymerization of the (meth)acrylic resin is not particularly limited, but, among these, it is possible for a (meth)acrylic resin which has a repeating unit (also referred to below as a repeating unit X) derived from the (meth)acrylate monomer having a hydrocarbon group (preferably an aliphatic hydrocarbon group) having 6 or more carbon atoms (preferably 6 to 20 carbon atoms, and more preferably 8 to 18 carbon atoms) to suppress the relative dielectric constant to be low, which is preferable.

Examples of the (meth)acrylate monomer having a hydrocarbon group (preferably an aliphatic hydrocarbon group) having the number of carbon atoms described above include a (meth)acrylate having a chain aliphatic hydrocarbon group having the number of carbon atoms described above, and a (meth)acrylate having a cyclic aliphatic hydrocarbon group having the number of carbon atoms described above, more specifically, hexyl (meth)acrylate, 2-ethylhexyl (meth)acrylate, n-octyl (meth)acrylate, isooctyl (meth)acrylate, n-nonyl (meth)acrylate, isononcyl (meth)acrylate, n-decyl (meth)acrylate, isodecyl (meth)acryl ate, n-dodecyl (meth)acrylate, n-tridecyl (meth)acrylate, n-tetradecyl (meth)acrylate, n-hexadecyl (meth)acrylate, stearyl (meth)acrylate, cyclohexyl (meth)acrylate, benzyl (meth)acryl ate, isobornyl (meth)acrylate, dicyclopentenyl (meth)acrylate, dicyclopentanyl (meth)acrylate, dicyclopentenyloxyethyl (meth)acrylate, and the like. Among the (meth)acrylate monomers described above, from the viewpoint that the glass transition temperature (Tg) of the pressure-sensitive adhesive is easily controlled and it is possible to realize a lower dielectric constant, a combination of (meth)acrylate having a chain aliphatic hydrocarbon group such as 2-ethylhexyl (meth)acrylate, isodecyl (meth)acrylate or n-dodecyl (meth)acrylate and (meth)acrylate having a cyclic aliphatic hydrocarbon group such as isobornyl (meth)acrylate or dicyclopentenyloxyethyl (meth)acrylate is more preferable. More specifically, examples of one preferable embodiment of the (meth)acrylic polymer include a (meth)acrylic polymer having a repeating unit derived from a (meth)acrylate monomer having a chain aliphatic hydrocarbon group and a repeating unit derived from a (meth)acrylate monomer having a cyclic aliphatic hydrocarbon group.

In the (meth)acrylic resin, the content of the repeating unit X is preferably 90 mol % or more, and more preferably 95 mol % or more, with respect to all repeating units of the (meth)acrylic resin, from the viewpoint of a more excellent effect of the present invention. The upper limit is not particularly limited, but is 100 mol %.

In the pressure-sensitive adhesive composition B, a repeating unit derived from a monomer other than those described above may be included in the (meth)acrylic resin in a range in which the effect of the present invention is not impaired. In addition, one kind of (meth)acrylic resin may be used, or two or more kinds may be used in combination.

Specific examples of such a monomer include the "specific monomer A" and "other monomer" in the description of the pressure-sensitive adhesive composition A, or the like.

Furthermore, in the pressure-sensitive adhesive composition B, the (meth)acrylic resin may have a cross-linked structure. The method of forming the cross-linked structure is the same as the pressure-sensitive adhesive composition A described above. In addition, the specific examples of the cross-linking agent (including a polyfunctional monomer), the amounts used, and the like are the same as those of the pressure-sensitive adhesive composition A.

The polymerization method of the (meth)acrylic resin in the pressure-sensitive adhesive composition B is the same as for the (meth)acrylic resin of the pressure-sensitive adhesive composition A.

In the pressure-sensitive adhesive composition B, the weight average molecular weight of the (meth)acrylic resin is preferably 200,000 to 2,000,000, more preferably 300,000 to 1,500,000, and even more preferably 400,000 to 1,000,000. The method of measuring the weight average molecular weight is as described above.

Preferable examples of the hydrophobic compound included in the pressure-sensitive adhesive composition B include a tackifier or a rubber-based resin.

Examples of the tackifier include petroleum-based resins (for example, aromatic petroleum resins, aliphatic petroleum resins, C9 fraction resins, and the like), terpene-based resins (for example, α-pinene resins, β-pinene resins, terpene resins, hydrogenated terpene resins, terpene phenol resins, hydrogenated terpene phenol resins, aromatic modified terpene resins, aromatic modified hydrogenated terpene resin, and abietic acid ester-based resins), rosin-based resins (for example, partially hydrogenated gum rosin resins, erythritol-modified wood rosin resins, tall oil rosin resin, and wood rosin resin), coumarone indene resins (for example, coumarone indene styrene copolymer), and styrene-based resins (for example, polystyrene, copolymers of styrenes and a-methylstyrene, and the like), and the like.

In the resin described above, for example, for the terpene-based resin, it is possible to use commercially available products, and specific examples thereof include CLEARON P150, CLEARON P135, CLEARON P125, CLEARON P115, CLEARON P105, and CLEARON P85 (manufactured by Yasuhara Chemical Co., Ltd.).

As the tackifier, only one kind may be used, or two or more kinds may be used in combination. Here, the numerical values following the above-described CLEARON P represent the softening points of the respective components. That is, CLEARON P150 is intended to have a softening point of 150° C.

Here, from the viewpoint of more excellent pressure-sensitive adhesion of the pressure-sensitive adhesive sheet to be obtained, the softening point of the tackifier described above is preferably 105° C. or more, more preferably 110° C. or more, and even more preferably 120° C. or more. Although the upper limit is not particularly limited, the upper limit is often 160° C. or less, and more often 150° C. or less.

Here, the measurement of the softening point of the tackifier is a value measured according to the ring and ball method of JIS K 2531.

Examples of the rubber-based resin (softening agent) include natural rubber, polyolefins, modified polyolefins, and the like. Examples of the polyolefins described above include polyisobutylene, polybutadiene (for example, a modified liquid polybutadiene, a polymer of 1,4-butadiene, 1,2-butadiene or a copolymer mixture thereof, or the like), polyisoprene, polybutene, hydrogenated polyisoprene, hydrogenated polybutadiene, styrene butadiene copolymers, copolymers and polymer mixtures of any combination selected from these groups, or the like. More preferable rubber components include polyisobutylene, polyisoprene, and polybutadiene. Polyisoprene is the most preferable.

Here, in the present specification, polybutadiene, polyisoprene, and the like are kinds of polyolefin. As the rubber-based resin, one kind may be used alone, or two or more kinds may be used in combination.

Among the hydrophobic compounds described above, from the viewpoint of being able to further improve the pressure-sensitive adhesion, it is preferable to use at least one kind of resin selected from the group consisting of a terpene-based resin, a rosin-based resin, a coumarone indene-based resin, a styrene-based resin, and a rubber-based resin. More preferably, at least one kind of resin selected from a terpene-based resin (preferably a terpene resin and a hydrogenated terpene resin, and more preferably a hydrogenated terpene resin) and a rubber-based resin is used.

It is possible to use the hydrophobic compounds alone or in a combination of two or more and in a case where two or more kinds are used in combination, for example, different kinds of resins may be used in combination, and resins with different softening points and Tg while being the same kind of resin may be combined.

Here, it is desirable that the O/C ratio of the hydrophobic compound (particularly rubber component) described below is 0, that is, that the hydrophobic compound is formed only of carbon atoms without including oxygen atoms.

The content ratio of the hydrophobic compound (the content of the hydrophobic compound/the content of the (meth)acrylic resin) with respect to the (meth)acrylic resin in the pressure-sensitive adhesive composition B is preferably 0.25 to 4, and more preferably 0.5 to 2.

The O/C ratio described above is calculated by calculating the number of moles (molar amount) of oxygen atoms and the number of moles (molar amount) of carbon atoms, of the raw material included in the pressure-sensitive adhesive layer formed by the pressure-sensitive adhesive composition B and determining the ratio thereof.

For example, in a case where the material used for the pressure-sensitive adhesive layer formed by the pressure-sensitive adhesive composition B is a polymer consisting only of repeating units including 10 carbon atoms and 2 oxygen atoms, the O/C ratio is 2/10=0.2.

In addition, in a case where two or more kinds of repeating units are included in the material used for the pressure-sensitive adhesive layer formed by the pressure-sensitive adhesive composition B, the O/C ratio is obtained using the molar amount contained in each repeating unit. Specific examples will be described below.

Here, a detailed description will be given of a method for calculating the O/C ratio in a case where the pressure-sensitive adhesive layer formed by the pressure-sensitive adhesive composition B includes the repeating unit X derived from the monomer X including 14 carbon atoms and 2 oxygen atoms and the repeating unit Y derived from the monomer Y including 6 carbon atoms and 2 oxygen atoms. Here, the content molar amounts of the repeating unit X and the repeating unit Y described above are set to 0.8 mol and 0.2 mol, respectively. Here, even in a case where the monomer X and the monomer Y each become the repeating unit X and the repeating unit Y, there is no change in the number of the carbon atoms and oxygen atoms, and the molar amount of the repeating units described above is synonymous with the molar amount of the monomer X and the monomer Y.

First, the number of moles of carbon atoms is calculated by totaling the number of moles of carbon atoms derived from the repeating unit X and the number of moles of carbon atoms derived from the repeating unit Y. Specifically, the number of moles of carbon atoms is [0.8 (molar amount of repeating unit X)×14 (number of carbon atoms in repeating unit X)]+[0.2 (molar amount of repeating unit Y)×6 (number of carbon atoms in repeating unit Y)]=12.4.

In addition, the number of moles of oxygen atoms is calculated as [0.8 (molar amount of repeating unit X)×2 (number of oxygen atoms in repeating unit X)]+[0.2 (molar amount of repeating unit Y)×2 (number of oxygen atoms in the repeating unit Y)]=2.0.

Therefore, the O/C ratio is calculated as 2.0/12.4=0.16.

In addition, for example, in a case where only two kinds of (meth)acrylic resin and hydrophobic compound are included in the pressure-sensitive adhesive layer formed by the pressure-sensitive adhesive composition B, the O/C ratio of the pressure-sensitive adhesive layer is calculated by (number of moles of oxygen atoms of the (meth)acrylic resin+number of moles of oxygen atoms of the hydrophobic compound)/(number of moles of carbon atoms of the (meth)acrylic resin+number of moles of carbon atoms of the hydrophobic compound).

In addition, in a case where there is an additive X (optional component) including carbon atoms and/or oxygen atoms other than the (meth)acrylic resin and the hydrophobic compound in the pressure-sensitive adhesive layer formed by the pressure-sensitive adhesive composition B, the O/C ratio of the pressure-sensitive adhesive layer is calculated in consideration of the number of moles of the carbon atoms and the number of moles of the oxygen atoms of the additive X. More specifically, the O/C ratio of the pressure-sensitive adhesive layer in such a case is calculated by (number of moles of oxygen atoms of the (meth)acrylic resin+number of moles of oxygen atoms of the hydrophobic compound+number of moles of the oxygen atoms of the additive X)/(number of moles of carbon atoms of (meth) acrylic resin+number of moles of carbon atoms of hydrophobic compound+number of moles of carbon atoms of additive X).

It is possible to calculate the number of moles of oxygen atoms and carbon atoms in the pressure-sensitive adhesive layer formed by the pressure-sensitive adhesive composition B according to the charged amounts of known materials with known structural formulas which are used or according to elemental analysis.

The pressure-sensitive adhesive composition B may include the solvents exemplified for the pressure-sensitive adhesive composition A, as necessary. In addition, the pressure-sensitive adhesive composition B may contain various additives known in the related art exemplified in the description of the pressure-sensitive adhesive composition A described above.

<Structure of Pressure-Sensitive Adhesive Sheet>

Next, a description will be given of a preferable structure of the pressure-sensitive adhesive sheet of the present invention.

The pressure-sensitive adhesive sheet of the present invention has a first region and a second region. The first region and the second region have different positions to each other in the pressure-sensitive adhesive sheet, and at least one value of the relative dielectric constant and the temperature dependency at 20° C. is different between the regions.

Preferably, the value of the relative dielectric constant at 20° C. has a relationship where the first region>the second region, and the temperature dependency has a relationship where the first region≤the second region. Here, the improvement of the relative dielectric constant and the reduction of the temperature dependency tend to have a conflicting relationship. That is, in a case where the relative dielectric constant is improved, the temperature dependency is also easily increased, and in a case where the relative dielectric constant is lowered, the temperature dependency is also easily reduced. Therefore, setting the relationship between the temperature dependency and the relative dielectric constant in the first region and the second region as described above makes it easier to increase the relative dielectric constant of the pressure-sensitive adhesive sheet at 20° C. and to reduce the temperature dependency.

In a preferable embodiment of the first region, the relative dielectric constant described above at 20° C. is 4.0 or more, and the temperature dependency is 25% or less.

The relative dielectric constant of the first region at 20° C. is preferably 4.0 or more, more preferably 4.5 or more, and even more preferably 5.0 or more. Due to this, it is easier to set the relative dielectric constant of the pressure-sensitive adhesive sheet as a whole to the specific values described above. In addition, although the upper limit value is not particularly limited, from the viewpoint of decreasing the temperature dependency of the pressure-sensitive adhesive sheet and further suppressing the occurrence of malfunctions, the upper limit value is preferably 9.0 or less, more preferably 8.5 or less, and even more preferably 8.0 or less.

The temperature dependency described above of the first region is preferably 25% or less, more preferably 20% or less, and even more preferably 15% or less. Due to this, it is possible to further reduce the occurrence of malfunctions in the pressure-sensitive adhesive sheet.

Here, the relative dielectric constant and the temperature dependency in the first region are measured by forming a pressure-sensitive adhesive sheet consisting of only the first region and using this sheet in the temperature dependency evaluation test described above.

Here, it is preferable to form the first region using the pressure-sensitive adhesive composition A described above. The pressure-sensitive adhesive composition A described above includes an acrylic resin having a repeating unit derived from the specific monomer A. This is because having a repeating unit derived from the specific monomer A makes it easy to improve the relative dielectric constant of a high dielectric constant layer. On the other hand, since the mobility of the hydroxyl group or the like derived from the specific monomer A easily changes depending on the temperature, the relative dielectric constant of the pressure-sensitive adhesive sheet into which this group is introduced also tends to change greatly according to the temperature (that is, the temperature dependency decreases). Therefore, as a result of an intensive investigation, the present inventors found that, by controlling the glass transition temperature (Tg) of the first region, when the maximum value of the relative dielectric constant is designed to be in the actual use temperature range (around −10° C. to 40° C.) of the touch panel, it is possible to satisfy both characteristics of improvement of relative dielectric constant at 20° C. and reduction of temperature dependency at a higher level.

Here, the maximum value of the relative dielectric constant of the first region at −10° C. to 40° C. is measured using the pressure-sensitive adhesive sheet consisting only of the first region in the temperature dependency evaluation test described above.

In addition, from the viewpoint of simultaneously achieving an improvement in relative dielectric constant at 20° C. and a reduction in the temperature dependency at a higher level, it is preferable that the glass transition temperature (Tg) of the first region be 0° C. or less, more preferably −2° C. or less, even more preferably −50 to −5° C., and particularly preferably −40 to −8° C. The glass transition temperature of the first region is measured by the method described in following examples.

In a preferable embodiment of the second region, the relative dielectric constant described above at 20° C. is 4.0 or less and the temperature dependency described above is 20% or less. Due to this, it is easy to set the respective characteristics of the relative dielectric constant, the temperature dependency, and the 180 degree peel strength of the pressure-sensitive adhesive sheet of the present invention to the specific values described above.

The relative dielectric constant of the second region at 20° C. is preferably 4.0 or less, more preferably 3.8 or less, and even more preferably 3.5 or less. Due to this, it is easier to set the relative dielectric constant of the pressure-sensitive adhesive sheet as a whole to the specific value. In addition, although the upper limit value is not particularly limited, from the viewpoint of improving the sensitivity and improving the operability of the touch panel, the upper limit value is preferably 2.0 or more, more preferably 2.5 or more, and even more preferably 2.8 or more.

The temperature dependency described above of the second region is preferably 20% or less, more preferably 15% or less, and even more preferably 10% or less. Due to this, it is possible to further reduce the occurrence of malfunctions in the pressure-sensitive adhesive sheet.

Here, the relative dielectric constant and the temperature dependency in the second region are measured by forming a pressure-sensitive adhesive sheet consisting only of the second region and using this in the temperature dependency evaluation test described above.

Here, the formation of the second region is preferably performed using the pressure-sensitive adhesive composition B described above. The pressure-sensitive adhesive composition B includes a (meth)acrylic resin and a hydrophobic compound as described above. This makes it possible to improve the 180-degree peel strength of the pressure-sensitive adhesive sheet. On the other hand, although it is possible to improve the temperature dependency by the action of the hydrophobic compound, the relative dielectric constant tends to be decreased. Therefore, as a result of an intensive investigation, the present inventors found that, by forming the second region in addition to the first region in the pressure-sensitive adhesive sheet, it is possible to exhibit an effect of further improving the 180 degree peel strength according to the second region while maintaining the effect of further improving the relative dielectric constant according to the first region.

That is, the pressure-sensitive adhesive sheet of the present invention having the first region and the second region makes it possible to satisfy all characteristics of relative dielectric constant at 20° C., temperature dependency, and 180 degree peel strength at higher levels.

In the pressure-sensitive adhesive sheet of the present invention, the positional relationship between the first region and the second region is not particularly limited, but a laminated structure having a layer consisting of the first region (also referred to below as the "first layer") and a layer consisting of a second region (also referred to below as the "second layer") is preferable. In addition, the relative dielectric constant of the first layer is preferably higher than the relative dielectric constant of the second layer.

Specifically, it is preferable that at least the surface in contact with another member in the pressure-sensitive adhesive sheet is the second layer, and more preferable that the second layer be provided on both surfaces of the first layer. Due to this, it is possible to further improve the 180 degree peel strength while satisfying the characteristics of the relative dielectric constant at 20° C. and the temperature dependency of the pressure-sensitive adhesive sheet at a high level.

The ratio (second layer/first layer) of the thickness of the second layer with respect to the thickness of the first layer is preferably 0.05 to 0.5, more preferably 0.06 to 0.3, and even more preferably 0.1 to 0.2. Due to this, it is possible to satisfy all the characteristics of the relative dielectric constant, temperature dependency, and 180 degree peel strength at a higher level.

Here, the thickness of the second layer refers to the thickness provided on one surface of the first layer.

In the case where the pressure-sensitive adhesive sheet of the present invention has a laminated structure including a first layer and a second layer, the content of the hydrophobic compound described above included in the second layer is 20% to 80% by mass (preferably 25% to 75% by mass, and more preferably 30% to 70% by mass) with respect to the total mass of the second layer, and 1% to 30% by mass (preferably 2% to 28% by mass, and more preferably 4% to 25% by mass) with respect to the total mass of the pressure-sensitive adhesive sheet. Due to this, it is possible to suppress a decrease in the relative dielectric constant due to the use of the second layer, thus it is possible to obtain a pressure-sensitive adhesive sheet having a high relative dielectric constant.

<Method for Manufacturing Pressure-Sensitive Adhesive Sheet>

The forming method for forming the pressure-sensitive adhesive sheet is not particularly limited, and it is possible to adopt a known method. For example, there is a method in which the pressure-sensitive adhesive composition is coated onto a predetermined base material (for example, a peeling sheet) and curing treatment is performed as necessary to form the pressure-sensitive adhesive sheet. Here, after the pressure-sensitive adhesive sheet is formed, a peeling sheet may be laminated on the surface of the pressure-sensitive adhesive sheet.

In addition, in a case where the pressure-sensitive adhesive sheet has a laminated structure, for example, the pressure-sensitive adhesive sheet may be formed by sequentially coating the pressure-sensitive adhesive composition in the order of desired lamination, or by forming each layer separately in advance and then bonding the layers.

Examples of methods for coating the pressure-sensitive adhesive composition include a gravure coater, a Comma coater, a bar coater, a knife coater, a die coater, a roll coater, and the like.

In addition, examples of the curing treatment include a heat curing treatment and a light curing treatment.

Here, the pressure-sensitive adhesive sheet may be a kind that does not have a base material (a base material-less pressure-sensitive adhesive sheet) or may be a kind having a base material on which a pressure-sensitive adhesive sheet is arranged on at least one main surface of the base material (a pressure-sensitive adhesive sheet with a base material, for example, a double-sided pressure-sensitive adhesive sheet with a base material having a pressure-sensitive adhesive sheet on both surfaces of a base material, or a single-sided pressure-sensitive adhesive sheet with a base material having a pressure-sensitive adhesive sheet on only one side of a base material).

[Laminate for Touch Panel and Capacitance-Type Touch Panel]

The pressure-sensitive adhesive sheet described above is used for a capacitance-type touch panel application and is arranged to bring various members into close contact with each other.

Figure 3:
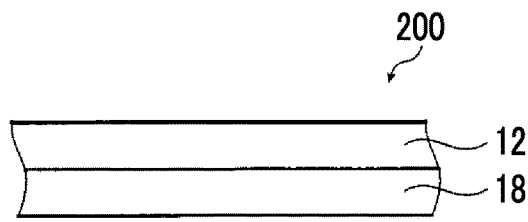
FIG. 3 is a cross-sectional view of a first embodiment of a laminate for a touch panel of the present invention.

For example, as shown in FIG. 3, the pressure-sensitive adhesive sheet 12 described above may be arranged on the capacitance-type touch panel sensor 18 to form the laminate for a touch panel laminate 200.

Figure 4:
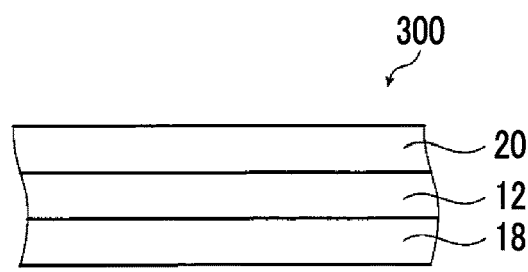
FIG. 4 is a cross-sectional view of a second embodiment of the laminate for a touch panel of the present invention.

In addition, as shown in FIG. 4, the pressure-sensitive adhesive sheet 12 may be arranged between the protective substrate 20 and the capacitance-type touch panel sensor 18 to form the laminate for a touch panel laminate 300. As described above, in a case where the pressure-sensitive adhesive sheet 12 has a laminated structure including the first layer and the second layer and the second layer is provided on both surfaces of the first layer, the second layer is positioned on the side in contact with the protective substrate 20 and the side in contact with the capacitance-type touch panel sensor 18 in the pressure-sensitive adhesive sheet 12.

Figure 5A:
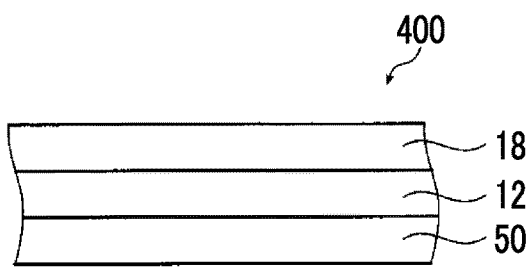
FIGS. 5A and 5B are cross-sectional views of a capacitance-type touch panel of the present invention.

In addition, as shown in FIG. 5A, the pressure-sensitive adhesive sheet 12 may be arranaed between the display device 50 and the capacitance-type touch panel sensor 18 to form the capacitance-type touch panel 400.

Figure 5B:
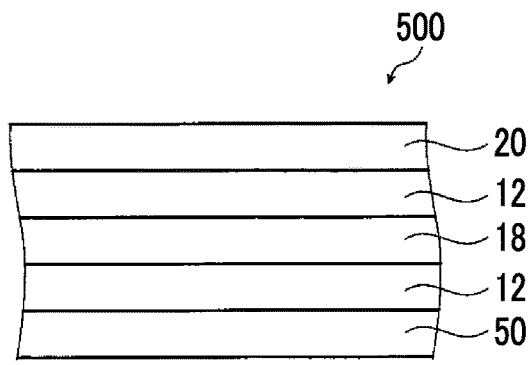

Furthermore, as shown in FIG. 5B, the pressure-sensitive adhesive sheet 12 may be arranged between the display device 50 and the capacitance-type touch panel sensor 18 and between the capacitance-type touch panel sensor 18 and the protective substrate 20 to form the capacitance-type touch panel 500.

A detailed description will be given of various members used in the laminate for a touch panel laminate and the capacitance-type touch panel.

(Capacitance-Type Touch Panel Sensor)

A capacitance-type touch panel sensor 18 is a sensor which is arranged on a display device (on the operator side) and which detects a position of an external conductor such as human fingers using changes in capacitance generated when the external conductor such as human fingers comes into contact therewith (or comes near).

The configuration of the capacitance-type touch panel sensor 18 is not particularly limited, but the capacitance-type touch panel sensor typically has detection electrodes (specifically, detection electrodes which extend in an X direction and detection electrodes which extend in a Y direction) and specifies the coordinates of a finger by detecting capacitance changes of the detection electrodes with which the finger is in contact or which is in vicinity of the finger.

Detailed description will be given of a favorable aspect of the capacitance-type touch panel sensor 18 using FIG. 6.

Figure 6:
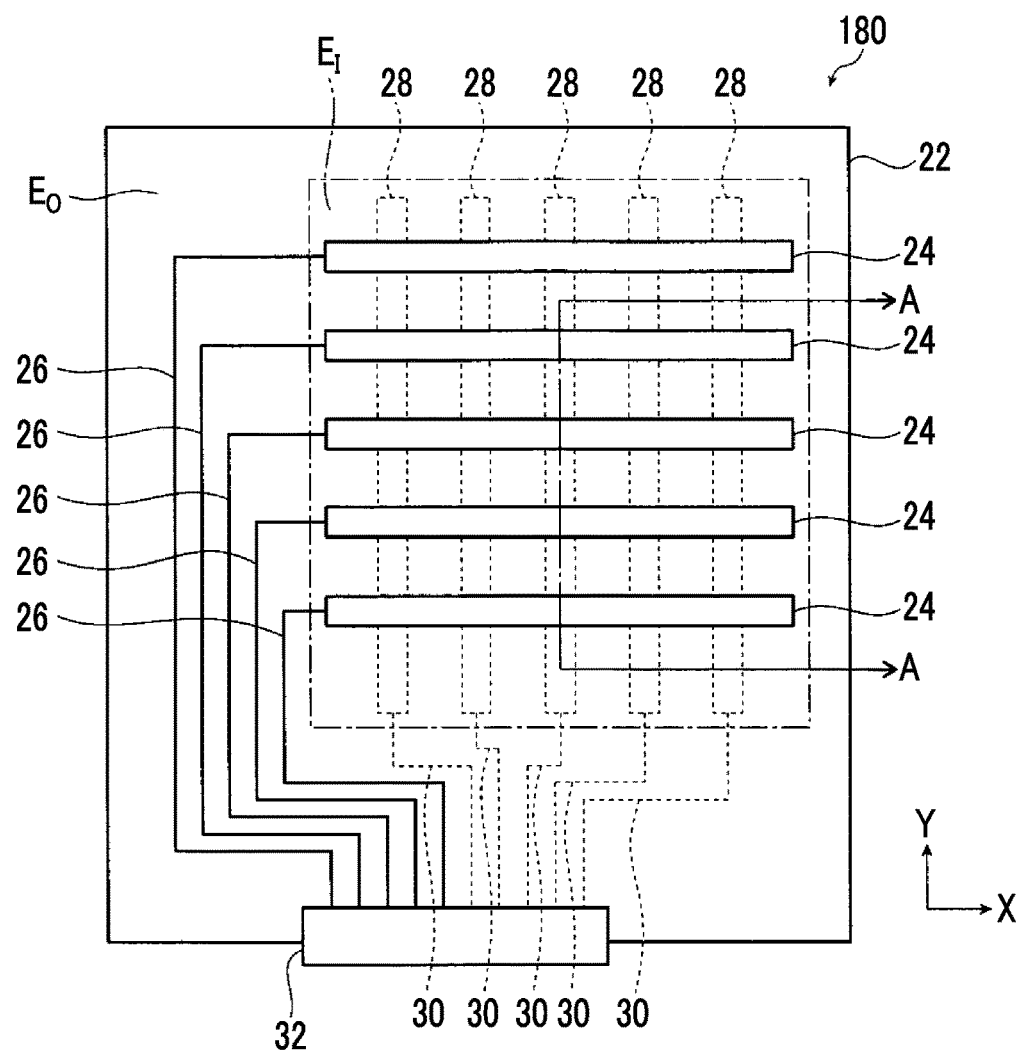
FIG. 6 is a plan view of an embodiment of a capacitance-type touch panel sensor.
Figure 7:
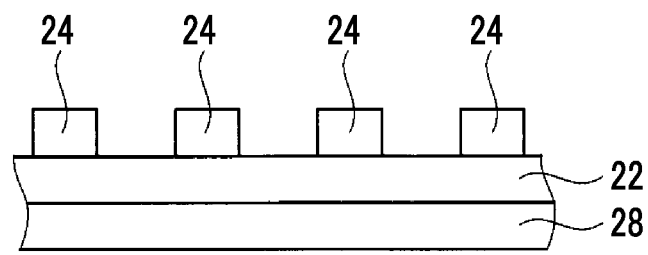
FIG. 7 is a cross-sectional view taken along a cut-away line A-A shown in FIG. 6.

A planar diagram of a capacitance-type touch panel sensor 180 is shown in FIG. 6. FIG. 7 is a cross-sectional view which cuts FIG. 6 along a cut line A-A. The capacitance-type touch panel sensor 180 includes a substrate 22, first detection electrodes 24 which are arranged on one main surface (on a front surface) of the substrate 22, first lead-out wiring 26, second detection electrodes 28 which are arranged on the other main surface (on a rear surface) of the substrate 22, second lead-out wiring 30, and a flexible printed wiring board 32. Here, a region in which there are the first detection electrodes 24 and the second detection electrodes 28 forms an input region $E_I$ (an input region (a sensing portion) which is able to detect a contact with an object) in which an input operation is possible by a user and the first lead-out wiring 26, the second lead-out wiring 30, and the flexible printed wiring board 32 are arranged in an outside region $E_O$ which is positioned on the outside of the input region $E_I$.

Detailed description will be given below of the configuration described above.

The substrate 22 is a member which fulfills a role of supporting the first detection electrodes 24 and the second detection electrodes 28 in the input region $E_I$ and fulfills a role of supporting the first lead-out wiring 26 and the second lead-out wiring 30 in the outside region $E_O$.

The substrate 22 preferably transmits light appropriately. In detail, the total light transmittance of the substrate 22 is preferably 85% to 100%.

The substrate 22 preferably has an insulation property (an insulating substrate). That is, the substrate 22 is a layer for securing the insulation property between the first detection electrodes 24 and the second detection electrodes 28.

The substrate 22 is preferably a transparent substrate (specifically, a transparent insulating substrate). Specific examples thereof include an insulating resin substrate, a ceramic substrate, a glass substrate, and the like. Among these, an insulating resin substrate is preferable for the reason of being excellent in toughness.

Examples of the material which forms the insulating resin substrate more specifically include polyethylene terephthalate, polyether sulfone, polyacryl-based resins, polyurethane-based resins, polyester, polycarbonate, polysulfone, polyamide, polyarylate, polyolefin, cellulose-based resins (for example, triacetyl cellulose resins), polyvinyl chloride, cycloolefin-based resins, and the like. Among these, for the reason of being excellent in transparency, polyethylene terephthalate, cycloolefin-based resins, polycarbonate, and triacetyl cellulose resins are preferable.

The substrate 22 is a single layer in FIG. 6 but may be a plurality of layers such as two or more layers.

The thickness of the substrate 22 (in a case where the substrate 22 has a plurality of layers such as two or more layers, the total thicknesses thereof) is not particularly limited, but is preferably 5 to 350 μm and more preferably 30 to 150 μm. It is possible to obtain the desired visible light transmittance within the ranges described above and the handling is also easy.

In addition, the planar view shape of the substrate 22 is substantially rectangular in FIG. 6; however, the present invention is not limited thereto. For example, the shape may be circular or polygonal.

The first detection electrodes 24 and the second detection electrodes 28 are sensing electrodes which sense changes in capacitance and form a sensing portion (a sensor portion). That is, in a case where a fingertip is in contact with a touch panel, the mutual capacitance between the first detection electrodes 24 and the second detection electrodes 28 changes and the position of the fingertip is calculated by an integrated circuit (IC) based on the change amount.

The first detection electrodes 24 have a role of detecting the input position of a finger of a user which comes near the input region $E_I$ in the X direction and have a function of generating capacitance between itself and the finger. The first detection electrodes 24 are electrodes which extend in a first direction (the X direction) and which are arranged at predetermined intervals in a second direction (the Y direction) which is orthogonal to the first direction and include a predetermined pattern as will be described below.

The second detection electrodes 28 have a role of detecting an input position of the finger of a user which comes near the input region $E_I$ in the Y direction and has a function of generating capacitance in-between itself and a finger. The second detection electrodes 28 are electrodes which extend in a second direction (the Y direction) and which are arranged at predetermined intervals in the first direction (the X direction) and include a predetermined pattern as will be described below. Five of the first detection electrodes 24 and five of the second detection electrodes 28 are provided in FIG. 6; however, the number is not particularly limited as long as the number is plural.

Figure 8:
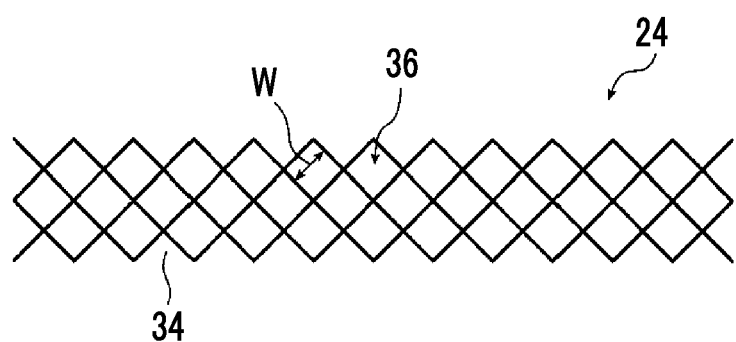
FIG. 8 is an enlarged plan view of the first detection electrode.

In FIG. 6, the first detection electrodes 24 and the second detection electrodes 28 are formed by conductive thin wires. A part of an enlarged planar diagram of the first detection electrode 24 is shown in FIG. 8. As shown in FIG. 8, the first detection electrode 24 is formed by conductive thin wires 34 and includes a plurality of grids 36 formed by the intersecting conductive thin wires 34. Here, the second detection electrodes 28 also include a plurality of the grids 36 formed by the intersecting conductive thin wires 34 in the same manner as the first detection electrode 24.

Examples of the material of the conductive thin wires 34 include metals such as gold (Au), silver (Ag), copper (Cu), and aluminum (Al), alloys of these metals, metal oxides such as ITO, tin oxide, zinc oxide, cadmium oxide, gallium oxide, and titanium oxide, and the like. Among these, silver is preferable for the reason of the excellent conductivity of the conductive thin wires 34.

In the conductive thin wires 34, a binder is preferably included from the viewpoint of adhesion between the conductive thin wires 34 and the substrate 22.

The binder is preferably a water-soluble polymer (for example, gelatin or the like) for the reason that the adhesion between the conductive thin wires 34 and the substrate 22 is more excellent.

In addition, a polymer (also simply referred to below as a polymer) which is different from the gelatin described above may be used with gelatin as a binder.

The line width of the conductive thin wires 34 is not particularly limited; however, from the viewpoint that it is possible to comparatively easily form low resistant electrodes, 30 μm or less is preferable, 15 μm or less is more preferable, 10 μm or less is even more preferable, 9 μm or less is particularly preferable, 7 μm or less is most preferable, 0.5 μm or more is preferable, and 1.0 μm or more is more preferable.

The thickness of the conductive thin wires 34 is not particularly limited, but, from the viewpoint of conductivity and visibility, it is possible to select from 0.00001 mm to 0.2 mm, preferably 30 μm or less, more preferably 20 μm or less, even more preferably 0.01 to 9 μm, and most preferably 0.05 to 5 μm.

The grid 36 includes an opening region surrounded by the conductive thin wires 34. A length W of one side of the grid 36 is preferably 800 μm or less, more preferably 600 μm or less, and preferably 400 μm or more.

In the first detection electrodes 24 and the second detection electrodes 28, in terms of the visible light transmittance, the opening ratio is preferably 85% or more, more preferably 90% or more, and most preferably 95% or more. The opening ratio is equivalent to a ratio entirely taken up by the transmitted portion apart from the conductive thin wires 34 in the first detection electrodes 24 or the second detection electrodes 28 in a predetermined region.

The grid 36 has a substantially rhomboid shape. However, the shape may be polygonal (for example, triangular, quadrangular, hexagonal, or a random polygon) other than this. In addition, the shape of one side may be a curve or an arc other than a straight line.

Here, the conductive thin wires 34 are formed as a mesh pattern in FIG. 8; however, the present invention is not limited to this aspect and may be a stripe pattern.

The first lead-out wiring 26 and the second lead-out wiring 30 are members which fulfil a role of applying a voltage to the first detection electrodes 24 and the second detection electrodes 28 respectively.

The first lead-out wiring 26 is arranged on the substrate 22 in the outside region $E_O$, one end thereof is electrically connected with the corresponding first detection electrode 24, and the other end is electrically connected with the flexible printed wiring board 32.

The second lead-out wiring 30 is arranged on the substrate 22 in the outside region $E_O$, one end thereof is electrically connected with the corresponding second detection electrode 28, and the other end is electrically connected with the flexible printed wiring board 32.

Here, 5 of the first lead-out wiring 26 and 5 of the second lead-out wiring 30 are illustrated in FIG. 6; however, the number is not particularly limited and a plurality thereof are generally arranged according to the number of the detection electrodes.

Examples of the material which forms the first lead-out wiring 26 and the second lead-out wiring 30 include metal such as gold (Au), silver (Ag), and copper (Cu), metal oxides such as tin oxide, zinc oxide, cadmium oxide, gallium oxide, and titanium oxide, and the like. Among these, silver is preferable for the reason of excellent conductivity.

Here, in terms of the adhesion with the substrate 22 being better, a binder is preferably included in the first lead-out wiring 26 and the second lead-out wiring 30. The binder type is as described above.

The flexible printed wiring board 32 is a board where a plurality of wires and terminals are provided on a substrate and is connected with each of the other ends of the first lead-out wiring 26 and each of the other ends of the second lead-out wiring 30 and fulfills a role of connecting the capacitance-type touch panel sensor 180 and an external apparatus (for example, a display device).

(Method for Manufacturing Capacitance-Type Touch Panel Sensor)

The method for manufacturing the capacitance-type touch panel sensor 180 is not particularly limited and it is possible to adopt methods which are known in the art. Examples thereof include a method for exposing a photoresist film on a metal foil which is formed on both main surfaces of the substrate 22, carrying out a developing process, forming a resist pattern, and etching the metal foil which is exposed from the resist pattern. In addition, examples thereof include a method for printing a paste which includes metal fine particles or metal nanowire on both main surfaces of the substrate 22 and carrying out metal plating on the paste. In addition, examples thereof also include a method of printing and forming on the substrate 22 using a screen printing plate or gravure printing plate or an ink jet forming method.

Furthermore, examples thereof include a method using halogenated silver other than the methods described above. In more detail, examples thereof include a method which includes a step (1) of forming a halogenated silver emulsion layer (also simply referred to below as a photosensitive layer) which contains halogenated silver and a binder on each of both surfaces of the substrate 22 and a step (2) of carrying out a developing process after exposing the photosensitive layer.

Description will be given below of each of the steps.

[Step (1): Photosensitive Layer Forming Step]

Step (1) is a step of forming a photosensitive layer which contains halogenated silver and a binder on both surfaces of the substrate 22.

The method for forming the photosensitive layer is not particularly limited; however, in terms of productivity, a method for bringing a composition for forming a photosensitive layer which contains halogenated silver and a binder into contact with the substrate 22 and forming a photosensitive layer on both surfaces of the substrate 22 is preferable.

After detailed description is given of an aspect of the composition for forming a photosensitive layer which is used in the method described above, detailed description will be given below of the procedure of the steps.

The composition for forming a photosensitive layer contains halogenated silver and a binder.

The volume ratio of the halogenated silver to the binder included in the composition for forming a photosensitive layer is not particularly limited and is appropriately adjusted so as to be in the favorable volume ratio range of the metal and the binder in the conductive thin wires 34 described above.

The composition for forming a photosensitive layer contains a solvent as necessary.

Examples of the solvent to be used include water, an organic solvent, an ionic liquid, and a mixed solvent thereof.

The content of the solvent to be used is not particularly limited, but is preferably in a range of 30 mass % to 90 mass % with respect to the total mass of the halogenated silver and the binder, and more preferably 50 mass % to 80 mass %.

(Procedure of Steps)

The method for bringing the composition for forming a photosensitive layer and the substrate 22 into contact is not particularly limited and it is possible to adopt methods which are known in the art. Examples thereof include a method for coating the composition for forming a photosensitive layer on the substrate 22, a method for immersing the substrate 22 in the composition for forming a photosensitive layer, and the like.

The content of the binder in the formed photosensitive layer is not particularly limited, but is preferably 0.3 $g/m^2$ to 5.0 $g/m^2$, and more preferably 0.5 $g/m^2$ to 2.0 $g/m^2$.

In addition, the content of the halogenated silver in the photosensitive layer is not particularly limited; however, in terms of the conductivity of the conductive thin wires 34 being better, 1.0 $g/m^2$ to 20.0 $g/m^2$ in silver conversion is preferable, and 5.0 $g/m^2$ to 15.0 $g/m^2$ is more preferable.

Here, a protective layer consisting of a binder may be further provided on the photosensitive layer as necessary. Providing a protective layer prevents scratches or improves the mechanical characteristics.

[Step (2): Exposing and Developing Step]

Step (2) is a step of forming the first detection electrodes 24 and the first lead-out wiring 26 and the second detection electrodes 28 and the second lead-out wiring, 30 by carrying out a developing process after pattern exposing the photosensitive layer which is obtained in step (1) described above.

Detailed description will be firstly given below of the pattern exposing process and then detailed description will be given of the developing process.

(Pattern Exposing)

Carrying out exposure in the form of a pattern with respect to the photosensitive layer makes the halogenated silver in the photosensitive layer form a latent image in the exposure region. Conductive thin wires are formed by a developing process which will be described below in the region in which the latent image is formed. On the other hand, in a non-exposure region in which exposure is not carried out, halogenated silver melts and flows away from the photosensitive layer in a case of a fixing process which will be described below and a transparent film is obtained.

The light source which is used in a case of exposure is not particularly limited and examples thereof include light such as visible rays and ultraviolet rays, radiation such as X rays, and the like.

The method for performing the pattern exposure is not particularly limited and, for example, the pattern exposure may be performed by surface exposure which uses a photo mask or may be performed by scanning exposure using a laser beam. Here, the shape of the pattern is not particularly limited and is appropriately adjusted according to the pattern of the conductive thin wires to be formed.

(Developing Process)

The method for developing process is not particularly limited and it is possible to adopt methods which are known in the art. For example, it is possible to use general developing process techniques which are used for silver salt photograph films, printing paper, printing plate films, emulsion masks for photo masks, and the like.

The kind of developer used in a case of the developing process is not particularly limited, but, for example, it is also possible to use a PQ developer, a MQ developer, a MAA developer, or the like. In addition, it is also possible to use a lithographic developer.

It is possible to include a fixing process which is performed for the purpose of removing silver salt in the non-exposure portion and stabilization in the developing process. It is possible for the fixing process to use fixing process techniques which are used for silver salt photograph films, printing paper, printing plate films, emulsion masks for photo masks, and the like.

The fixing temperature in the fixing step is preferably approximately 20° C. to approximately 50° C., and more preferably 25° C. to 45° C. In addition, the fixing time is preferably 5 seconds to 1 minute and more preferably 7 seconds to 50 seconds.

The mass of metal silver which is included in the exposure portion (the conductive thin wire) after the developing process preferably has a content ratio of 50 mass % or more with respect to the mass of silver which is included in the exposure portion before exposure, and more preferably 80 mass % or more. When the mass of silver which is included in the exposure portion is 50 mass % or more with respect to the mass of silver which is included in the exposure portion before exposure, it is possible to obtain high conductivity, which is preferable.

Other than the steps described above, the following undercoat layer forming step, antihalation layer forming step, or heating process may be carried out as necessary.

(Undercoat Layer Forming Step)

For the reason of having excellent adhesion between the substrate 22 and the halogenated silver emulsion layer, a step of forming an undercoat layer which includes the binder described above on both surfaces of the substrate 22 is preferably carried out before step (1) described above.

The binder to be used is as described above. The thickness of the undercoat layer is not particularly limited; however, in terms of being able to further suppress the adhesion and the rate of change in the mutual capacitance, 0.01 to 0.5 µm is preferable, and 0.01 to 0.1 µm is more preferable.

(Antihalation Layer Forming Step)

From the viewpoint of thinning the conductive thin wires 34, a step of forming an antihalation layer on both surfaces of the substrate 22 is preferably carried out before step (1) described above.

(Step (3): Heating Step)

Step (3) is carried out as necessary, and is a step of carrying out a heating process after the developing process described above. By carrying out the present step, fusion welding occurs between the binders and the hardness of the conductive thin wires 34 is increased further. In particular, in a case of dispersing polymer particles in a composition for forming a photosensitive layer as a binder (in a case where the binder is polymer particles in latex), by carrying out the present step, fusion welding occurs between the polymer particles and the conductive thin wires 34 which exhibit the desired hardness are formed.

Favorable conditions are appropriately selected for the conditions of the heating process according to the binder to be used; however, from the viewpoint of the film-forming temperature of polymer particles, 40° C. or more is preferable, 50° C. or more is more preferable, and 60° C. or more is even more preferable. In addition, from the viewpoint of suppressing curling and the like in the substrate, 150° C. or less is preferable, and 100° C. or less is more preferable.

The heating time is not particularly limited; however, from the viewpoint of suppressing curling and the like in the substrate and the viewpoint of productivity, 1 minute to 5 minutes is preferable, and 1 minute to 3 minutes is more preferable.

Here, since it is possible to carry out the heating process along with a drying step which is generally performed after the exposing and developing process, it is not necessary to add a new step for film-forming the polymer particles, which is excellent from the viewpoint of productivity, cost, and the like.

Here, by carrying out the step described above, a light transmitting portion which includes a binder is formed between the conductive thin wires 34. Regarding the transmittance in the light transmitting portion, the transmittance which is indicated by the minimum value of the transmittance in the wavelength region of 380 nm to 780 nm is preferably 90% or more, more preferably 95% or more, even more preferably 97% or more, particularly preferably 98% or more, and most preferably 99% or more.

The light transmitting portion may include material other than the binder described above and examples thereof include a sparingly-soluble silver agent and the like.

The aspects of the capacitance-type touch panel sensor are not limited to the aspect in FIG. 6 described above and there may be other aspects.

Figure 9:
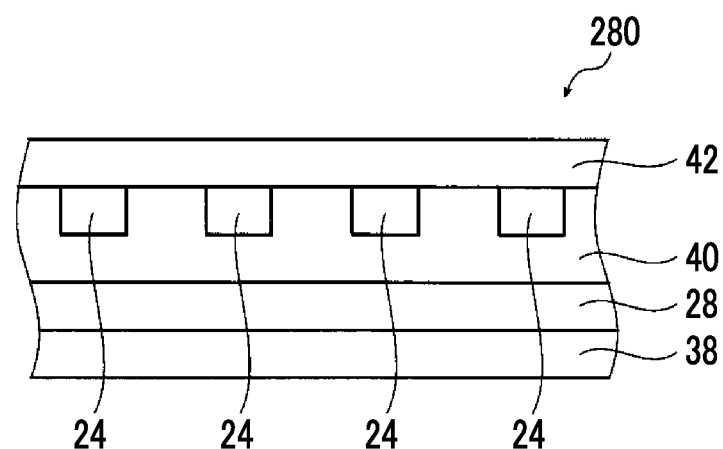
FIG. 9 shows a partial cross section of another embodiment of a capacitance-type touch panel sensor.

For example, as shown in FIG. 9, the capacitance-type touch panel sensor 280 comprises a first substrate 38, a second detection electrode 28 arranged on the first substrate 38, and a second lead-out wiring (not shown) electrically connected to one end of the second detection electrode 28 and arranged on the first substrate 38, a pressure-sensitive adhesive sheet 40, a first detection electrode 24, a first lead-out wiring (not shown) electrically connected to one end of the first detection electrode 24, a second substrate 42 adjacent to the first detection electrode 24 and the first lead-out wiring, and a flexible printed wiring board (not shown).

As shown in FIG. 9, since the capacitance-type touch panel sensor 280 has the same configuration as the capacitance-type touch panel sensor 180 except for the points of the first substrate 38, the second substrate 42, and the pressure-sensitive adhesive sheet 40, the same components are denoted by the same reference numerals, and description thereof will be omitted.

The definitions of the first substrate 38 and the second substrate 42 are the same as the definition of the substrate 22 described above.

The pressure-sensitive adhesive sheet 40 is a layer for bringing the first detection electrode 24 and the second detection electrode 28 into close contact with each other, and is preferably optically transparent (preferably a transparent pressure-sensitive adhesive sheet). A known material is used as the material forming the pressure-sensitive adhesive sheet 40, and the pressure-sensitive adhesive sheet 12 described above may be used as the pressure-sensitive adhesive sheet 40.

A plurality of the first detection electrodes 24 and a plurality of the second detection electrodes 28 in FIG. 9 are each used as shown in FIG. 6 and are arranged such that both are orthogonal to each other as shown in FIG. 6.

Here, as shown in FIG. 9, the capacitance-type touch panel sensor 280 corresponds to a capacitance-type touch panel sensor which is obtained by preparing two substrates with electrodes each having a substrate and detection electrodes and lead-out wirings arranged on the substrate surface, and pasting these together via a pressure-sensitive adhesive sheet with the electrodes facing each other.

Figure 10:
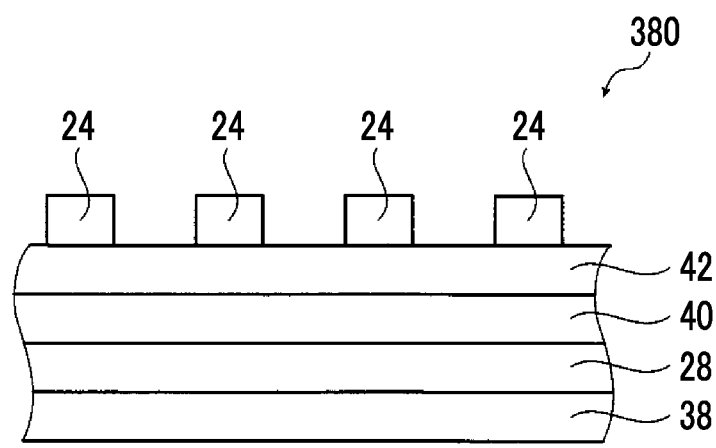
FIG. 10 shows a partial cross section of another embodiment of a capacitance-type touch panel sensor.

Examples of another aspect of the capacitance-type touch panel sensor include the aspect shown in FIG. 10.

A capacitance-type touch panel sensor 380 comprises the first substrate 38, second detection electrodes 28 which are arranged on the first substrate 38, second lead-out wiring (which is not shown in the diagram) which is electrically connected with one end of the second detection electrode 28 and which is arranged on the first substrate 38, the pressure-sensitive adhesive sheet 40, the second substrate 42, first detection electrodes 24 which are arranged on the second substrate 42, first lead-out wiring (which is not shown in the diagram) which is electrically connected with one end of the first detection electrode 24 and which is arranged on the second substrate 42, and a flexible printed wiring board (which is not shown in the diagram).

Since the capacitance-type touch panel sensor 380 shown in FIG. 10 has the same layers as the capacitance-type touch panel sensor 280 shown in FIG. 9 except that the order of each layer is different, the same reference numerals are given to the same constituent elements and description thereof will be omitted.

In addition, a plurality of the first detection electrodes 24 and a plurality of the second detection electrodes 28 in FIG. 10 are each used as shown in FIG. 6 and are arranged such that both are orthogonal to each other as shown in FIG. 6.

Here, the capacitance-type touch panel sensor 380 shown in FIG. 10 corresponds to a capacitance-type touch panel sensor which is obtained by preparing two electrode-attached substrates, each of which has a substrate and detection electrodes and lead-out wires which are arranged on the substrate surfaces and adhering the substrates via a pressure-sensitive adhesive sheet such that one substrate in the electrode-attached substrates and the electrodes of the other electrode-attached substrate face each other.

As another aspect of the capacitance-type touch panel sensor, for example, in FIG. 6, the conductive thin wires 34 of the first detection electrodes 24 and the second detection electrodes 28 may be formed by metal oxide particles and metal paste such as silver paste and copper paste. Among these, in terms of having excellent conductivity and transparency, a conductive film and a silver nanowire conductive film using silver thin wires are preferable.

In addition, the first detection electrodes 24 and the second detection electrodes 28 are formed by a mesh structure of the conductive thin wires 34; however, without being limited to this aspect, for example, the first detection electrodes 24 and the second detection electrodes 28 may be formed by a metal oxide thin film (a transparent metal oxide thin film) such as ITO and ZnO and a transparent conductive film which forms a network using metal nanowire such as silver nanowire and copper nanowire.

Figure 11:
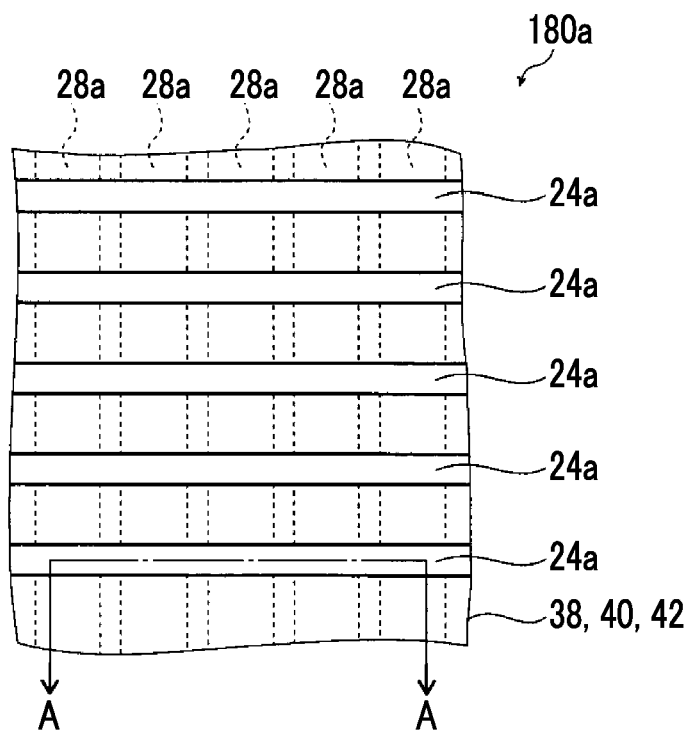
FIG. 11 is a partial plan view of another embodiment of a capacitance-type touch panel sensor.
Figure 12:
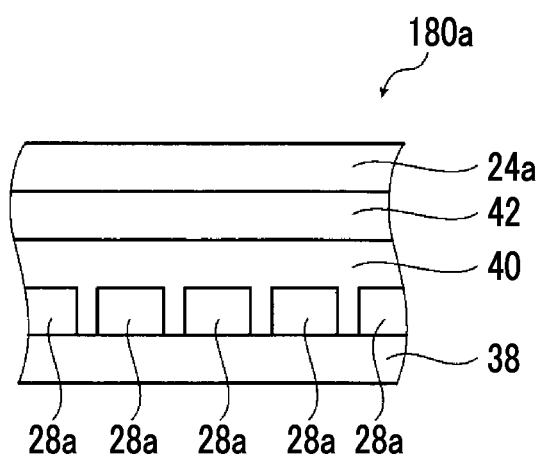
FIG. 12 is a cross-sectional view taken along a cut-away line A-A shown in FIG. 11.

In more detail, as shown in FIG. 11, the aspect may be a capacitance-type touch panel sensor 180a which has first detection electrodes 24a and second detection electrodes 28a which are formed of a transparent metal oxide. FIG. 11 shows a partial planar diagram in an input region of the capacitance-type touch panel sensor 180a. FIG. 12 is a cross-sectional view which cuts FIG. 11 along the cut line A-A. The capacitance-type touch panel sensor 180a comprises the first substrate 38, second detection electrodes 28a which are arranged on the first substrate 38, second lead-out wiring (which is not shown in the diagram) which is electrically connected with one end of the second detection electrode 28a and which is arranged on the first substrate 38, the pressure-sensitive adhesive sheet 40, the second substrate 42, first detection electrodes 24a which are arranged on the second substrate 42, a first lead-out wire (which is not shown in the diagram) which is electrically connected with one end of the first detection electrodes 24a and which is arranged on the second substrate 42, and a flexible printed wiring board (which is not shown in the diagram).

Since the capacitance-type touch panel sensor 180a shown in FIG. 11 and FIG. 12 has the same layers as the capacitance-type touch panel sensor 380 shown in FIG. 10 except for the first detection electrodes 24a and the second detection electrodes 28a, the same reference numerals are given to the same constituent elements and description thereof will be omitted.

The capacitance-type touch panel sensor 180a shown in FIG. 11 and FIG. 12 corresponds to a capacitance-type touch panel sensor which is obtained by preparing two electrode-attached substrates, each of which has a substrate and detection electrodes and lead-out wires which are arranged on the substrate surface and adhering the substrates via a pressure-sensitive adhesive layer (pressure-sensitive adhesive sheet) such that one substrate in the electrode-attached substrates and the electrodes of the other electrode-attached substrate face each other.

As described above, the first detection electrodes 24a and the second detection electrodes 28a are electrodes which extend in the X axis direction and the Y axis direction respectively and are formed of a transparent metal oxide, for example, formed of indium tin oxide (ITO). Here, in FIG. 11 and FIG. 12, in order to utilize transparent electrodes ITO as a sensor, with respect to the level of the resistance of the indium tin oxide (ITO) itself, the total amount of the wiring resistance is reduced by gaining an electrode area, and the characteristics of the transparent electrode are utilized and the light transmittance is secured by reducing the thickness.

Here, examples of materials which are able to be used in the aspect described above other than ITO include zinc oxide (ZnO), indium zinc oxide (IZO), gallium zinc oxide (GZO), aluminum zinc oxide (AZO), and the like.

Here, it is possible to select the patterning of the electrode portion (the first detection electrodes 24a and the second detection electrodes 28a) according to the material of the electrode portion, and a photolithography method, a resist mask screen printing-etching method, an ink jet method, a printing method, and the like may be used.

(Protective Substrate)

The protective substrate 20 is a substrate arranged on the pressure-sensitive adhesive sheet and fulfills a role of protecting the capacitance-type touch panel sensor 18 to be described below from the external environment, and the main surface thereof forms a touch surface.

As the protective substrate 20, a transparent substrate is preferable, and a plastic film, a plastic plate, a glass plate, or the like may be used. It is desirable to appropriately select the thickness of the substrate according to the intended use.

As the raw materials of the plastic film and the plastic plate, for example, it is possible to use polyesters such as polyethylene terephthalate (PET) and polyethylene naphthalate (PEN); polyolefins such as polyethylene (PE), polypropylene (PP), polystyrene and ethylene-vinyl acetate copolymer (EVA); vinyl-base resins; polycarbonate (PC), polyamide, polyimide, acrylic resin, triacetyl cellulose (TAC), cycloolefin-based resin (COP), and the like.

In addition, as the protective substrate 20, a polarizing plate, a circularly polarizing plate, or the like may be used.

(Display Device)

The display device 50 is an apparatus having a display surface for displaying an image, and each member is arranged on the display screen side.

The kind of the display device 50 is not particularly limited, and it is possible to use a known display device. For example, a cathode ray tube (CRT) display device, a liquid crystal display device (LCD), an organic light emitting diode (OLED) display device, a vacuum fluorescent display (VFD), a plasma display panel (PDP), a surface electric field display (SED), a field emission display (FED), electronic paper (E-paper), and the like.

It is possible to suitably use the pressure-sensitive adhesive sheet described above for manufacturing a capacitance-type touch panel. Example uses include applying a pressure-sensitive adhesive sheet to be arranged between a display device and the capacitance-type touch panel sensor described above or between the capacitance-type touch panel sensor described above and a protective substrate, or between a substrate in a capacitance-type touch panel sensor and conductive films comprising detection electrodes arranged on the substrate.

In particular, the pressure-sensitive adhesive sheet of the present invention is preferably used for applying a pressure-sensitive adhesive layer adjacent to a detection electrode in a capacitance-type touch panel. Cases of being used in such a form are preferable since it is possible to remarkably reduce touch malfunctions due to the influence of changing factors.

Here, examples of a case where the pressure-sensitive adhesive sheet is adjacent to the detection electrode include a case where, in a case where a capacitance-type touch panel sensor has a form in which detection electrodes are arranged on a rear surface of a substrate, the pressure-sensitive adhesive sheet is arranged so as to contact the detection electrodes on both surfaces. In addition, examples of other cases include a case where a capacitance-type touch panel sensor has a substrate and two conductive films comprising detection electrodes arranged on one surface of the substrate and the pressure-sensitive adhesive sheet is arranged such that the detection electrodes are in contact in a case where the two conductive films are bonded. More specifically, examples thereof include cases using the embodiment of the pressure-sensitive adhesive sheet 40 in FIG. 9 and FIG. 10.

The interface of electronic devices has shifted from the graphical user interface to the era of more intuitive touch sensing, and mobile use environments other than mobile phones are also in development. Mobile devices equipped with capacitance-type touch panels are also expanding their applications to medium-sized tablets, notebook PCs, and the like, having started with small smart phones, and the tendency to expand the screen size to be used is increasing.

Since the number of operation lines (the number of detection electrodes) increases as the size of the input region capable of detecting the contact of the object of the capacitance-type touch panel sensor increases in the diagonal direction, it is necessary to compress the time required for scanning per line. In order to maintain an appropriate sensing environment for mobile use, reducing the parasitic capacitance and the temperature change amount of the capacitance-type touch panel sensor is an issue. In conventional pressure-sensitive adhesive layers, the temperature dependency of the relative dielectric constant is large, and as the size increases, there is a concern that the sensing program will not be able to keep up (malfunctions may occur). On the other hand, in the case of using the pressure-sensitive adhesive layer described above having a relative dielectric constant with a low temperature dependency, as the size of the input region (sensing portion) of the capacitance-type touch panel sensor capable of detecting contact with the object increases to be greater than five inches in the diagonal direction, an appropriate sensing environment is obtained, and in a case where the size is more preferably 8 inches or more and more preferably 10 inches or more, it is possible to realize a strong effect of suppressing malfunctions. Here, the shape of the input region indicated by the size is rectangular.

In addition, as the input region of the capacitance-type touch panel sensor increases, the size of the display screen of the display device also increases.

EXAMPLES

A more specific description will be given of the present invention using examples, but the present invention is not limited to the following examples as long as the gist of the present invention is not exceeded. Unless otherwise specified, "parts" and "%" are on a mass basis.

In the following description, in the case where the pressure-sensitive adhesive layer (pressure-sensitive adhesive sheet) has a laminated structure, the layer in the middle (the "first layer" described above) among the layers forming the pressure-sensitive adhesive sheet may be referred to as "high dielectric constant layer A" or "high dielectric constant layer" and the layer provided on both surfaces of the high dielectric constant layer A (the "second layer" described above) may be referred to as the "low dielectric constant layer B" or "low dielectric constant layer. In addition, in a case where the pressure-sensitive adhesive layer does not have a laminated structure, the pressure-sensitive adhesive layer may be referred to as the "high dielectric constant layer A" or "high dielectric constant layer".

Example 1

(Synthesis of Acrylic Polymer A and Production Method of Pressure-Sensitive Adhesive Film)

90 parts by mass of 2-ethylhexyl acrylate (EHA, manufactured by Wako Pure Chemical Industries, Ltd.), 10 parts by mass of 2-hydroxyethyl acrylate (2HEA, manufactured by Wako Pure Chemical Industries, Ltd.), and 100 parts by mass of ethyl acetate were added to a glass container and heated to reflux. Then, 0.03 parts by mass of 2,2'-azobis (isobutyronitrile) (AIBN, manufactured by Wako Pure Chemical Industries, Ltd.) were added thereto and a polymerization reaction was carried out for 2 hours. Furthermore, 0.57 parts by mass of 2,2'-azobis(isobutyronitrile) (AIBN, manufactured by Wako Pure Chemical Industries, Ltd.) were added thereto and stirred for 2 hours. The solution was diluted with toluene to obtain a polymer solution having a solid content of 40% by mass. The weight average molecular weight (Mw) of the acrylic polymer A obtained by GPC (based on polystyrene) was 420,000.

CORONATE L55E (manufactured by Nippon Polyurethane Industry Co., Ltd.) as an isocyanate-based cross-linking agent was added to the obtained polymer solution such that the solid content thereof was 2.0% by mass, and the mixture was thoroughly stirred, and the obtained pressure-sensitive adhesive composition A was coated onto a peeling film (peeling PET) with a thickness of 50 μm so as to have a dry film thickness (pressure-sensitive adhesive sheet layer thickness) of 100 μM with an applicator, dried at 100° C. for 3 minutes, further covered with peeling films, left to stand at 25° C. for 7 days, and a pressure-sensitive adhesive film in which peeling films were arranged on both surfaces of the pressure-sensitive adhesive layer was obtained.

Example 2

(Synthesis of Acrylic Polymer B and Production Method of Pressure-Sensitive Adhesive Film)

80 parts by mass of 2-ethylhexyl acrylate (EHA, manufactured by Wako Pure Chemical Industries, Ltd.), 20 parts by mass of 2-hydroxyethyl acrylate (2HEA, manufactured by Wako Pure Chemical Industries, Ltd.), and 100 parts by mass of ethyl acetate were added to a glass container and heated to reflux. 0.09 parts by mass of 2,2'-azobis(isobutyronitrile) (AIBN, manufactured by Wako Pure Chemical Industries, Ltd.) were added thereto and a polymerization reaction was carried out for 2 hours. Furthermore, 0.57 parts by mass of 2,2'-azobis(isobutyronitrile) (AIBN, manufactured by Wako Pure Chemical Industries, Ltd.) were added thereto and stirred for 2 hours. The solution was diluted with toluene to obtain a polymer solution having a solid content of 40% by mass. The weight average molecular weight (Mw) of the acrylic polymer B obtained by GPC (based on polystyrene) was 650,000.

CORONATE L55E (manufactured by Nippon Polyurethane Industry Co., Ltd.) as an isocyanate-based cross-linking agent was added to the obtained polymer solution such that the solid content thereof was 2.0% by mass, and the mixture was thoroughly stirred, and the obtained pressure-sensitive adhesive composition B was coated onto a peeling film (peeling PET) with a thickness of 50 μm with an applicator so as to have a dry film thickness (pressure-sensitive adhesive sheet layer thickness) of 100 μm, dried at 100° C. for 3 minutes, further covered with peeling films, left to stand at 25° C. for 7 days, and a pressure-sensitive adhesive film in which peeling films were arranged on both surfaces of the pressure-sensitive adhesive layer was obtained.

Example 3

(Synthesis of Acrylic Polymer C and Production Method of Pressure-Sensitive Adhesive Film)

60 parts by mass of 2-ethylhexyl acrylate (EHA, manufactured by Wako Pure Chemical Industries, Ltd.), 40 parts by mass of 2-hydroxyethyl acrylate (2HEA, manufactured by Wako Pure Chemical Industries, Ltd.), and 100 parts by mass of ethyl acetate were added to a glass container and heated to reflux. 0.15 parts by mass of 2,2'-azobis(isobutyronitrile) (AIBN, manufactured by Wako Pure Chemical Industries, Ltd.) were added thereto and a polymerization reaction was carried out for 2 hours. Furthermore, 0.57 parts by mass of 2,2'-azobis(isobutyronitrile) (AIBN, manufactured by Wako Pure Chemical Industries, Ltd.) were added thereto and stirred for 2 hours. The solution was diluted with toluene to obtain a polymer solution having a solid content of 40% by mass. The weight average molecular weight (Mw) of the acrylic polymer C obtained by GPC (based on polystyrene) was 720,000.

CORONATE L55E (manufactured by Nippon Polyurethane Industry Co., Ltd.) as an isocyanate-based cross-linking agent was added to the obtained polymer solution such that the solid content thereof was 2.0% by mass, and the mixture was thoroughly stirred, and the obtained pressure-sensitive adhesive composition C was coated onto a peeling film (peeling PET) with a thickness of 50 μm with an applicator so as to have a dry film thickness (thickness of the pressure-sensitive adhesive layer) of 100 μm, dried at 100° C. for 3 minutes, further covered with peeling films, left to stand at 25° C. for 7 days, and a pressure-sensitive adhesive film in which peeling films were arranged on both surfaces of the pressure-sensitive adhesive layer was obtained.

Example 4

(Synthesis of Acrylic Polymer D and Production Method of Pressure-Sensitive Adhesive Film)

80 parts by mass of n-hexyl acrylate (HA, manufactured by Wako Pure Chemical Industries, Ltd.), 80 parts by mass of 2-hydroxyethyl acrylate (2HEA, manufactured by Wako Pure Chemical Industries, Ltd.), and 100 parts by mass of ethyl acetate were added to a glass container and the mixture was heated to reflux. Then, 0.12 parts by mass of 2,2'-azobis (isobutyronitrile) (AIBN, manufactured by Wako Pure Chemical Industries, Ltd.) were added thereto and a polymerization reaction was carried out for 2 hours. Furthermore, 0.65 parts by mass of 2,2'-azobis(isobutyronitrile) (AIBN, manufactured by Wako Pure Chemical Industries, Ltd.) were added and stirred for 2 hours. The solution was diluted with toluene to obtain a polymer solution having a solid content of 40% by mass. The weight average molecular weight (Mw) of acrylic polymer D obtained by GPC (based on polystyrene) was 690,000.

CORONATE L55E (manufactured by Nippon Polyurethane Industry Co., Ltd.) as an isocyanate-based cross-linking agent was added to the obtained polymer solution such that the solid content thereof was 2.0% by mass, and the mixture was thoroughly stirred, and the obtained pressure-sensitive adhesive composition D was coated onto a peeling film (peeling PET) with a thickness of 50 μm with an applicator so as to have a dry film thickness (thickness of the pressure-sensitive adhesive layer) of 100 μm, dried at 100° C. for 3 minutes, further covered with peeling films, left to stand at 25° C. for 7 days, and a pressure-sensitive adhesive film in which peeling films were arranged on both surfaces of the pressure-sensitive adhesive layer was obtained.

Example 5

(Synthesis of Acrylic Polymer a and Production Method of Pressure-Sensitive Adhesive Film)

35 parts by mass of 2-ethylhexyl acrylate (EHA, manufactured by Wako Pure Chemical Industries, Ltd.), 5 parts by mass of 2-hydroxyethyl acrylate (2HEA, manufactured by Wako Pure Chemical Industries, Ltd.), 60 parts by mass of isobornyl acrylate (IBXA, manufactured by Kyoeisha Chemical Co., Ltd.), and 100 parts by mass of ethyl acetate were placed in a glass container, and the temperature was adjusted to 75° C. Then, 0.01 parts by mass of 2,2'-azobis (isobutyronitrile) (AIBN, manufactured by Wako Pure Chemical Industries, Ltd.) was added thereto, and a polymerization reaction was carried out for 2 hours. Furthermore, 0.25 parts by mass of 2,2'-azobis(isobutyronitrile) (AIBN, manufactured by Wako Pure Chemical Industries, Ltd.) were added thereto and stirred for 2 hours. The weight average molecular weight (Mw) of acrylic polymer a obtained by GPC (based on polystyrene) was 450,000. 37.5 parts by mass of YS RESIN TO 85 (manufactured by Yasuhara Chemical Co., Ltd.) and 37.5 parts by mass of YS RESIN LP (manufactured by Yasuhara Chemical Co., Ltd.) were added to 100 parts by mass of the obtained polymer solution, such that CORONATE L55E (manufactured by Nippon Polyurethane Industry Co., Ltd.) as an isocyanate-based crosslinking agent was 0.8% by mass in solid content and a pressure-sensitive adhesive composition a was obtained by further diluting the mixture with toluene such that the solid content concentration was 60% by mass.

The pressure-sensitive adhesive composition a obtained as described above was coated onto a peeling film (peeling PET) with a thickness of 50 μm by an applicator so that the dry film thickness (thickness of the pressure-sensitive adhesive layer) was 10 μm and dried at 100° C. for 3 minutes. Furthermore, the pressure-sensitive adhesive composition B produced in Example 2 described above was coated with an applicator such that the dry film thickness (thickness of the pressure-sensitive adhesive layer) was 80 μm and dried at 100° C. for 3 minutes. Furthermore, the pressure-sensitive adhesive composition a produced above was coated thereon with an applicator such that the dry film thickness (thickness of the pressure-sensitive adhesive layer) was 10 μm, dried at 100° C. for 3 minutes, further covered with peeling films, and left to stand at 25° C. for 7 days to obtain a pressure-sensitive adhesive film in which peeling films are arranged on both surfaces of a pressure-sensitive adhesive layer.

Here, the total amount of the hydrophobic compound (YS RESIN TO 85 and YS RESIN LP) included in the low dielectric constant layer (layer obtained from the pressure-sensitive adhesive composition a) provided on both surfaces of the high dielectric constant layer (pressure-sensitive adhesive composition B) was 60% by mass with respect to the total mass of the low dielectric constant layers provided on both surfaces, and was 12% by mass with respect to the entire pressure-sensitive adhesive layer.

Example 6

(Synthesis of Acrylic Polymer b and Production Method of Pressure-Sensitive Adhesive Film)

50 parts by mass of 2-ethylhexyl acrylate (EHA, manufactured by Wako Pure Chemical Industries, Ltd.), 5 parts by mass of 2-hydroxyethyl acrylate (2HEA, manufactured by Wako Pure Chemical Industries, Ltd.), 45 parts by mass of isobornyl acrylate (IBXA, manufactured by Kyoeisha Chemical Co., Ltd.), and 100 parts by mass of ethyl acetate were added to a glass container, and the temperature was adjusted to 75° C. Then, 0.01 parts by mass of 2,2'-azobis (isobutyronitrile) (AIBN, manufactured by Wako Pure Chemical Industries, Ltd.) was added thereto, and a polymerization reaction was carried out for 2 hours. Furthermore, 0.25 parts by mass of 2,2'-azobis(isobutyronitrile) (AIBN, manufactured by Wako Pure Chemical Industries, Ltd.) were added thereto and stirred for 2 hours. The weight average molecular weight (Mw) of the acrylic polymer b obtained by GPC (based on polystyrene) was 520,000. 13.3 parts by mass of YS RESIN TO 85 (manufactured by Yasuhara Chemical Co., Ltd.), 20.0 parts by mass of YS RESIN LP (manufactured by Yasuhara Chemical Co., Ltd.) were added to 100 parts by mass of the obtained polymer solution such that CORONATE L 55 E (manufactured by Nippon Polyurethane Industry Co., Ltd.) as an isocyanate-based crosslinking agent was 0.8% by mass in solid content and a pressure-sensitive adhesive composition b was obtained by further diluting the mixture with toluene such that the solid content concentration was 60% by mass.

The pressure-sensitive adhesive composition b obtained as described above was coated onto a peeling film (peeling PET) having a thickness of 50 μm with an applicator such that the dry film thickness (thickness of the pressure-sensitive adhesive layer) was 10 μm and dried at 100° C. for 3 minutes. Furthermore, the pressure-sensitive adhesive composition B produced in Example 2 described above was coated thereon with an applicator such that the dry film thickness (thickness of the pressure-sensitive adhesive layer) was 80 μm and dried at 100° C. for 3 minutes. Furthermore, the pressure-sensitive adhesive composition b produced above was coated thereon with an applicator such that the dry film thickness (thickness of the pressure-sensitive adhesive layer) was 10 μm, dried at 100° C. for 3 minutes, further covered with peeling films, and left to stand at 25° C. for 7 days to obtain a pressure-sensitive adhesive film in which peeling films are arranged on both surfaces of a pressure-sensitive adhesive layer.

Here, the total amount of the hydrophobic compound (YS RESIN TO 85 and YS RESIN LP) included in the low dielectric constant layer (layer obtained by the pressure-sensitive adhesive composition b) provided on both surfaces of the high dielectric constant layer (pressure-sensitive adhesive composition B) was 40% by mass with respect to the total mass of the low dielectric constant layer provided on both surfaces, and was 8% by mass with respect to the entire pressure-sensitive adhesive layer.

Example 7

(Photocurable Pressure-Sensitive Adhesive Composition G and Production Method of Pressure-Sensitive Adhesive Film)

In a glass container, 20 parts by mass of isobornyl acrylate (IBXA, manufactured by Kyoeisha Chemical Co., Ltd.), 5 parts by mass of 2-ethylhexyl acrylate (EHA, manufactured by Wako Pure Chemical Industries, Ltd.), 10.5 parts by mass of POLYVEST 110 (manufactured by Degussa), 38 parts by mass of CLEARON P135 (manufactured by Yasuhara Chemical Co., Ltd.), 22 parts by mass of UC-102 (manufactured by Kuraray Co., Ltd.), 3 parts by mass of LUCIRIN TPO (manufactured by BASF), 1.5 parts by mass of dodecanethiol (DDT, manufactured by Wako Pure Chemical Industries, Ltd.) were mixed and dissolved to obtain a photocurable pressure-sensitive adhesive composition G (also simply referred to below as "pressure-sensitive adhesive composition G").

The photocurable pressure-sensitive adhesive composition G obtained above was coated onto a peeling film (peeling PET) with a thickness of 50 μm with an applicator so that the dry film thickness (thickness of the pressure-sensitive adhesive layer) was 10 μm, and irradiated with ultraviolet rays at an irradiation intensity of 250 mW/cm$^2$ in a metal halide lamp using a conveyor-type exposure apparatus such that the irradiation dose was 1000 mJ/cm$^2$. Furthermore, the pressure-sensitive adhesive composition B produced in Example 2 described above was coated thereon with an applicator such that the dry film thickness (thickness of the pressure-sensitive adhesive layer) was 80 μm and dried at 100° C. for 3 minutes. Furthermore, the photocurable pressure-sensitive adhesive composition G produced as described above was coated thereon with an applicator such that the dry film thickness (thickness of the pressure-sensitive adhesive layer) was 10 μm and irradiated with ultraviolet rays at an irradiation intensity of 250 mW/cm$^2$ in a metal halide lamp using a conveyor-type exposure apparatus such that the irradiation dose was 1000 mJ/cm$^2$, further covered with peeling films, left to stand at 25° C. for 7 days, and a pressure-sensitive adhesive film in which peeling films were arranged on both surfaces of the pressure-sensitive adhesive layer was obtained.

Here, the total amount of the hydrophobic compounds (POLYVEST 110, CLEARON P 135 and UC-102) included in the low dielectric constant layer (layer obtained from the pressure-sensitive adhesive composition G) provided on both surfaces of the high dielectric constant layer (layer obtained from the pressure-sensitive adhesive composition B) was 70% by mass with respect to the total mass of the low dielectric constant layer provided on both surfaces, and was 14% by mass with respect to the entire pressure-sensitive adhesive layer.

Examples 8 to 12

The pressure-sensitive adhesive films of Examples 8 to 12 were obtained in the same manner as in Example 5 except that the film thickness configuration of the low dielectric constant layer obtained from the pressure-sensitive adhesive composition a and the high dielectric constant layer obtained from the pressure-sensitive adhesive composition B was as shown in Table 1 below.

Here, the film thickness of the low dielectric constant layer in Table 1 shows the film thickness on one surface of the high dielectric constant layer. In addition, the film thicknesses of the low dielectric constant layers provided on both surfaces of the high dielectric constant layer are the same.

In addition, in Examples 8 to 12, the total amounts of the hydrophobic compounds included in the low dielectric constant layers provided on both surfaces of the high dielectric constant layer were respectively 60% by mass with respect to the total mass of the low dielectric constant layers provided on both surfaces, and 36% by mass, 29% by mass, 19% by mass, 7% by mass, and 4% by mass with respect to the entire pressure-sensitive adhesive layer.

TABLE 1

| First Table | Film thickness of low dielectric constant layer | Film thickness of high dielectric constant layer | Film thickness ratio (Low dielectric constant layer/High dielectric constant layer) |
| --- | --- | --- | --- |
| Example 8 | 30 μm | 40 μm | 0.75 |
| Example 9 | 24 μm | 52 μm | 0.46 |
| Example 10 | 16 μm | 68 μm | 0.24 |
| Example 11 | 6 μm | 88 μm | 0.07 |
| Example 12 | 3 μm | 94 μm | 0.03 |

Example 13

(Synthesis of Acrylic Polymer E and Production Method of Pressure-Sensitive Adhesive Film)

85 parts by mass of 2-ethylhexyl acrylate (EHA, manufactured by Wako Pure Chemical Industries, Ltd.), 10 parts by mass of 2-hydroxyethyl acrylate (2HEA, manufactured by Wako Pure Chemical Industries, Ltd.), 5 parts by mass of acrylic acid (AA, manufactured by Wako Pure Chemical Industries, Ltd.) and 100 parts by mass of ethyl acetate were added to a glass container and heated to reflux. Then, 0.03 parts by mass of 2,2'-azobis(isobutyronitrile) (AIBN, manufactured by Wako Pure Chemical Industries, Ltd.) were added thereto and a polymerization reaction was carried out for 2 hours. Furthermore, 0.58 parts by mass of 2,2'-azobis(isobutyronitrile) (AIBN, manufactured by Wako Pure Chemical Industries, Ltd.) were added thereto and stirred for 2 hours. The solution was diluted with toluene to obtain a polymer solution having a solid content of 40% by mass. The weight average molecular weight (Mw) of acrylic polymer E obtained by GPC (based on polystyrene) was 690,000. CORONATE L55E (manufactured by Nippon Polyurethane Industry Co., Ltd.) as an isocyanate-based cross-linking agent was added to the obtained polymer solution such that the solid content thereof was 2.0% by mass, followed by thorough stirring to obtain a pressure-sensitive adhesive composition E.

The pressure-sensitive adhesive composition a obtained in Example 5 was coated onto a peeling film (peeling PET) with a thickness of 50 μm with an applicator such that the dry film thickness (thickness of the pressure-sensitive adhesive layer) was 10 μm and dried at 100° C. for 3 minutes. Furthermore, the pressure-sensitive adhesive composition E produced above was coated by an applicator such that the dry film thickness (thickness of the pressure-sensitive adhesive layer) was 80 μm and dried at 100° C. for 3 minutes. Furthermore, the pressure-sensitive adhesive composition a produced above was coated thereon by an applicator such that the dry film thickness (thickness of the pressure-sensitive adhesive layer) was 10 μm, dried at 100° C. for 3 minutes, further covered with peeling films, left to stand at 25° C. for 7 days, and a pressure-sensitive adhesive film in which peeling films were arranged on both surfaces of the pressure-sensitive adhesive layer was obtained.

The total amount of the hydrophobic compounds (YS RESIN TO 85 and YS RESIN LP) included in the low dielectric constant layer (layer obtained from the pressure-sensitive adhesive composition a) provided on both surfaces of the high dielectric constant layer (layer obtained from the pressure-sensitive adhesive composition E) was 60% by mass with respect to the total mass of the low dielectric constant layer provided on both surfaces, and was 12% by mass with respect to the entire pressure-sensitive adhesive layer.

Example 14

(Synthesis of Acrylic Polymer F and Production Method of Pressure-Sensitive Adhesive Film)

80 parts by mass of 2-ethylhexyl acrylate (EHA, manufactured by Wako Pure Chemical Industries, Ltd.), 5 parts by mass of 2-hydroxyethyl acrylate (2HEA, manufactured by Wako Pure Chemical Industries, Ltd.), 15 parts by mass of N-vinylpyrrolidone (NVP, manufactured by Wako Pure Chemical Industries, Ltd.), and 100 parts by mass of ethyl acetate were added to a glass container, and heated to reflux. Then, 0.02 parts by mass of 2,2'-azobis(isobutyronitrile) (AIBN, manufactured by Wako Pure Chemical Industries, Ltd.) were added thereto and a polymerization reaction was carried out for 2 hours. Furthermore, 0.54 parts by mass of 2,2'-azobis(isobutyronitrile) (AIBN, manufactured by Wako Pure Chemical Industries, Ltd.) were added thereto and stirred for 2 hours. The solution was diluted with toluene to obtain a polymer solution having a solid content of 40% by mass. The weight average molecular weight (Mw) of acrylic polymer F obtained by GPC (based on polystyrene) was 710,000. CORONATE L55E (manufactured by Nippon Polyurethane Industry Co., Ltd.) as an isocyanate-based cross-linking agent was added to the obtained polymer solution such that the solid content was 2.0% by mass, followed by thorough stirring to obtain a pressure-sensitive adhesive composition F.

The pressure-sensitive adhesive composition a obtained in Example 5 was coated onto a peeling film (peeling PET) with a thickness of 50 μm with an applicator such that the dry film thickness (thickness of the pressure-sensitive adhesive layer) was 10 μm and dried at 100° C. for 3 minutes. Furthermore, the pressure-sensitive adhesive composition F produced above was coated with an applicator such that the dry film thickness (thickness of the pressure-sensitive adhesive layer) was 80 μm and dried at 100° C. for 3 minutes. Furthermore, the pressure-sensitive adhesive composition a produced above was coated thereon with an applicator such that the dry film thickness (thickness of the pressure-sensitive adhesive layer) was 10 μm, dried at 100° C. for 3 minutes, further covered with peeling films, left to stand at 25° C. for 7 days, and a pressure-sensitive adhesive film in which peeling films were arranged on both surfaces of the pressure-sensitive adhesive layer was obtained.

Here, the total amount of the hydrophobic compounds (YS RESIN TO 85 and YS RESIN LP) included in the low dielectric constant layer (layer obtained from the pressure-sensitive adhesive composition a) provided on both surfaces of the high dielectric constant layer (layer obtained from the pressure-sensitive adhesive composition F) was 60% by mass with respect to the total mass of the low dielectric constant layer provided on both surfaces, and was 12% by mass with respect to the entire pressure-sensitive adhesive layer.

Example 15

The pressure-sensitive adhesive composition a obtained in Example 5 was coated onto a peeling film (peeling PET) with a thickness of 50 μm with an applicator such that the dry film thickness (thickness of the pressure-sensitive adhesive layer) was 10 μm, and dried at 100° C. for 3 minutes. Furthermore, the pressure-sensitive adhesive composition C produced in Example 3 was coated with an applicator such that the dry film thickness (thickness of the pressure-sensitive adhesive layer) was 80 μm and dried at 100° C. for 3 minutes. Furthermore, the pressure-sensitive adhesive composition a produced above was coated thereon with an applicator such that the dry film thickness (thickness of the pressure-sensitive adhesive layer) was 10 μm, dried at 100° C. for 3 minutes, further covered with peeling films, left to stand at 25° C. for 7 days, and a pressure-sensitive adhesive film in which peeling films were arranged on both surfaces of the pressure-sensitive adhesive layer was obtained.

Here, the total amount of the hydrophobic compounds (YS RESIN TO 85 and YS RESIN LP) included in the low dielectric constant layer (layer obtained from the pressure-sensitive adhesive composition a) provided on both surfaces of the high dielectric constant layer (layer obtained from the pressure-sensitive adhesive composition C) was 60% by mass with respect to the total mass of the low dielectric constant layer provided on both surfaces, and was 12% by mass with respect to the entire pressure-sensitive adhesive layer.

Comparative Example 1

(Synthesis of Acrylic Polymer X and Production Method of Pressure-Sensitive Adhesive Film)

25 parts by mass of 2-ethylhexyl acrylate (EHA, manufactured by Wako Pure Chemical Industries, Ltd.), 25 parts by mass of 2-hydroxyethyl acrylate (2HEA, manufactured by Wako Pure Chemical Industries, Ltd.), 50 parts by mass of isobornyl acrylate (IBXA, manufactured by Kyoeisha Chemical Co., Ltd.), and 100 parts by mass of ethyl acetate were added to a glass container and heated to reflux. Then, 0.12 parts by mass of 2,2'-azobis(isobutyronitrile) (AIBN, manufactured by Wako Pure Chemical Industries, Ltd.) were added thereto and a polymerization reaction was carried out for 2 hours. Furthermore, 0.52 parts by mass of 2,2'-azobis (isobutyronitrile) (AIBN, manufactured by Wako Pure Chemical Industries, Ltd.) were added thereto and stirred for 2 hours. The solution was diluted with toluene to obtain a polymer solution having a solid content of 40% by mass. The weight average molecular weight (Mw) of acrylic polymer X obtained by GPC (based on polystyrene) was 470,000.

CORONATE L55E (manufactured by Nippon Polyurethane Industry Co., Ltd.) was added to the obtained polymer solution as an isocyanate-based cross-linking agent such that the solid content thereof was 2.0% by mass, and the mixture was sufficiently stirred, and the obtained pressure-sensitive adhesive composition X was coated onto a peeling film (peeling PET) with a thickness of 50 μm with an applicator such that the dry film thickness (thickness of the pressure-sensitive adhesive layer) was 100 μm, dried at 100° C. for 3 minutes, further covered with peeling films, left to stand at 25° C. for 7 days, and a pressure-sensitive adhesive film in which peeling films were arranged on both surfaces of the pressure-sensitive adhesive layer was obtained.

Comparative Example 2

(Synthesis of Acrylic Polymer Y and Production Method of Pressure-Sensitive Adhesive Film)

33 parts by mass of 2-ethylhexyl acrylate (EHA, manufactured by Wako Pure Chemical Industries, Ltd.), 2 parts by mass of 2-hydroxyethyl acrylate (2HEA, manufactured by Wako Pure Chemical Industries, Ltd.), 65 parts by mass of isobornyl acrylate (IBXA, manufactured by Kyoeisha Chemical Co., Ltd.), and 100 parts by mass of ethyl acetate were added to a glass container, and the temperature was adjusted to 75° C. Then, 0.02 parts by mass of 2,2'-azobis (isobutyronitrile) (AIBN, manufactured by Wako Pure Chemical Industries, Ltd.) were added thereto and a polymerization reaction was carried out for 2 hours. Furthermore, 0.52 parts by mass of 2,2'-azobis(isobutyronitrile) (AIBN, manufactured by Wako Pure Chemical Industries, Ltd.) were added thereto and stirred for 2 hours. Then, the solution was diluted with toluene to obtain a polymer solution having a solid content of 40% by mass. The weight average molecular weight (Mw) of the acrylic polymer Y obtained by GPC (based on polystyrene) was 430,000.

CORONATE L55E (manufactured by Nippon Polyurethane Industry Co., Ltd.) was added to the obtained polymer solution as an isocyanate-based cross-linking agent such that the solid content thereof was 2.0% by mass, the mixture was sufficiently stirred, and the obtained pressure-sensitive adhesive composition Y was coated onto a peeling film (peeling PET) with a thickness of 50 μm with an applicator such that the dry film thickness (thickness of the pressure-sensitive adhesive layer) was 100 μm, dried at 100° C. for 3 minutes, further covered with peeling films, left to stand at 25° C. for 7 days, and a pressure-sensitive adhesive film in which peeling films were arranged on both surfaces of the pressure-sensitive adhesive layer was obtained.

<<Various Evaluations>>

The thickness of the pressure-sensitive adhesive layer shown in the production of the pressure-sensitive adhesive sheet is an arithmetic mean value obtained by measuring the thickness at 5 positions using a micrometer. With respect to the pressure-sensitive adhesive layer consisting of the high dielectric constant layer and the low dielectric constant layer, the thickness was measured for each layer by the same method.

(Measurement of Glass Transition Temperature Tg of Pressure-Sensitive Adhesive Layer)

The peeling film of the obtained pressure-sensitive adhesive film was peeled off, a dynamic viscoelasticity measurement apparatus DVA-255 (manufactured by IT Measurement Control Co., Ltd.) was used to perform viscoelasticity measurement (storage modulus and loss modulus) in shear mode, with a temperature increase rate of 5° C./min, and at 10 Hz and the temperature at which the value of tan δ=loss modulus/storage modulus was the maximum was taken as the glass transition temperature Tg.

With respect to the Tg of the pressure-sensitive adhesive sheets of Examples 5 to 15, which are laminated structures of a low dielectric constant layer and a high dielectric constant layer, after producing a pressure-sensitive adhesive film using only a pressure-sensitive adhesive composition used for producing a high dielectric constant layer under the same conditions as in Example 1, the Tg of the obtained pressure-sensitive adhesive film consisting only of the high dielectric constant layer was measured under the conditions described above.

(Relative Dielectric Constant and Temperature Dependency)

(Production of Sample for Temperature Dependency Evaluation Test)

One peeling PET of the pressure-sensitive adhesive films produced in each Example and Comparative Example was peeled off, the exposed pressure-sensitive adhesive layer was bonded onto an Al (aluminum) electrode having a length of 20 mm×20 mm in width and 0.5 mm in thickness, after which the other peeling PET was peeled off, the Al electrode described above was bonded to the exposed pressure-sensitive adhesive layer, and thereafter subjected to a pressure defoaming treatment at 40° C. and 5 atmospheres for 60 minutes to produce samples for the temperature dependency evaluation test.

Here, the thickness of the pressure-sensitive adhesive layer in each sample was determined by measuring the thickness of the sample for temperature dependency evaluation test with a micrometer at five locations and subtracting the thickness of two Al electrodes from the average value.

(Method of Temperature Dependency Evaluation Test)

Impedance measurement was performed at 1 MHz with an impedance analyzer (Agilent Technologies, 4294 A) using the sample for the temperature dependency evaluation test produced above, and the relative dielectric constant of the pressure-sensitive adhesive layer (the relative dielectric constant of the whole pressure-sensitive adhesive layer) was measured.

Specifically, the temperature of the sample for temperature dependency evaluation test was gradually increased from −10° C. to 40° C. at intervals of 10° C., and the impedance was measured at 1 MHz using an impedance analyzer (Agilent Technologies, 4294 A) at each temperature to obtain a capacitance C. Here, at each temperature, the sample was allowed to stand for 5 minutes until the temperature of the sample was constant.

Thereafter, using the obtained capacitance C, the relative dielectric constant at each temperature was calculated from equation (X) below.

$$\text{relative dielectric constant} = (\text{capacitance } C \times \text{thickness } T)/(\text{area } S \times \text{vacuum dielectric constant } \varepsilon_0) \quad \text{Equation (X):}$$

Here, the thickness T is the thickness of the pressure-sensitive adhesive layer, the area S is the area of the aluminum electrode (length of 20 mm×width 20 mm), the vacuum dielectric constant $\varepsilon_0$ is a physical constant ($8.854 \times 10^{-12}$ F/m).

From the calculated relative dielectric constant, the minimum value and the maximum value were selected and the temperature dependency (%) was obtained from the expression [(maximum value−minimum value)/minimum value× 100].

Here, the adjustment of the temperature was carried out using a liquid nitrogen cooling stage in case of a low temperature and using a hot plate in case of a high temperature.

In addition, in Examples 1 to 4 and Comparative Examples 1 and 2, on the basis of the relative dielectric constant at each temperature obtained from the temperature dependency evaluation test, the temperature (° C.) at which the maximum value is present was recorded and set as the temperature (° C.) at which the maximum value of the relative dielectric constant of the high dielectric constant layer A was present, and shown in Table 2. In addition, the temperature dependency obtained by the temperature dependency evaluation test and the relative dielectric constant at 20° C. are also shown in Table 2.

For the pressure-sensitive adhesive sheets of Examples 5 to 15, which are laminated structures of a low dielectric constant layer and a high dielectric constant layer, after a pressure-sensitive adhesive film using only a pressure-sensitive adhesive composition used for producing a high dielectric constant layer was produced under the same conditions as Example 1, the film was used to measure the relative dielectric constant at each temperature according to the above temperature dependency evaluation test, and the temperature (° C.) at which the maximum value exists was recorded. In addition, the temperature dependency of the high dielectric constant layer obtained by the temperature dependency evaluation test and the relative dielectric constant at 20° C. are also shown in Table 2.

Furthermore, with respect to the pressure-sensitive adhesive sheets of Examples 5 to 15, after a pressure-sensitive adhesive film using only the pressure-sensitive adhesive composition used for producing the low dielectric constant layer was produced under the same conditions as in Example 1, the film was used to determine the temperature dependency of the low dielectric constant layer and the relative dielectric constant at 20° C. based on the temperature dependency evaluation test described above. The results are shown in Table 2.

(Pressure-Sensitive Adhesive Strength)

Each of the pressure-sensitive adhesive films produced in examples and comparative examples was cut to 2.5 cm×5.0 cm, one of the peeling films was peeled off, and the exposed pressure-sensitive adhesive layer was bonded to a glass substrate. Next, the other peeling film was peeled off, and a polyimide film (KAPTON film 100 H (25 μm thickness, manufactured by Du Pont-Toray Co., Ltd.)) cut to 15 cm×3 cm in advance was bonded to the exposed pressure-sensitive adhesive layer. The produced evaluation sample was subjected to a pressurized defoaming treatment at 40° C. and 5 atm for 60 minutes to produce an evaluation sample.

Next, one end of the KAPTON film not in contact with the pressure-sensitive adhesive layer was set in a shape of pulling (peeling) in the direction of 180 degrees using AUTOGRAPH AGS-X manufactured by Shimadzu Corporation, and a 180 degree peel tension test (speed: 50 mm/s) (180 degree peel strength test) was performed and the pressure-sensitive adhesive strength was determined.

(Malfunction Evaluation Method)

First, description will be given below of a method of manufacturing the touch panel used in the malfunction evaluation method.

(Production of Halogenated Silver Emulsion)

0.16 μm nuclear particles were formed by adding amounts corresponding to 90% of each of the liquid 2 and liquid 3 described below to the liquid 1 described below which was kept at 38° C. and pH 4.5 at the same time over 20 minutes while stirring. Subsequently, the particles were grown to 0.21 μm by adding the liquid 4 and liquid 5 described below over 8 minutes and further adding an amount of the remaining 10% of the liquid 2 and liquid 3 described below over 2 minutes. Furthermore, the particle forming was completed by adding 0.15 g of potassium iodide and aging the resultant for 5 minutes.

| Liquid 1: | |
|---|---|
| Water | 750 ml |
| Gelatin | 9 g |
| Sodium chloride | 3 g |
| 1,3-dimethylimidazolidine-2-thione | 20 mg |
| Sodium benzene thiosulfonate | 10 mg |
| Citric acid | 0.7 g |
| Liquid 2: | |
| Water | 300 ml |
| Silver nitrate | 150 g |
| Liquid 3: | |
| Water | 300 ml |
| Sodium chloride | 38 g |
| Potassium bromide | 32 g |
| Potassium hexachloroiridate (III) (0.005% KCl 20% aqueous solution) | 8 ml |
| Ammonium hexachlororhodate (0.001% NaCl 20% aqueous solution) | 10 ml |
| Liquid 4: | |
| Water | 100 ml |
| Silver nitrate | 50 g |
| Liquid 5: | |
| Water | 100 ml |
| Sodium chloride | 13 g |
| Potassium bromide | 11 g |
| Yellow prussiate of potash | 5 mg |

After that, water cleansing was carried out by a flocculation method following a typical method. In detail, the temperature was decreased to 35° C. and the pH was decreased using sulfuric acid (the pH was in a range of 3.6±0.2) until the halogenated silver was precipitated. Next, approximately 3 liters of a supernatant liquid were removed (first water cleansing). After further adding 3 liters of distilled water, sulfuric acid was added until the halogenated silver was precipitated. 3 liters of a supernatant liquid were removed again (second water cleansing). The same operation as in the second water cleansing was repeated one more time (third water cleansing) and the water cleansing and salt removal step was completed. The emulsion after water cleansing and salt removal was adjusted to pH 6.4 and pAg 7.5, 3.9 g of gelatin, 10 mg of sodium benzene thiosulfonate, 3 mg of sodium benzene thiosulfinate, 15 mg of sodium thiosulfate, and 10 mg of chloroauric acid were added, chemosensitization was carried out so as to obtain an optimum sensitivity at 55° C., and 100 mg of 1,3,3a,7-tetraazaindene as a stabilizer and 100 mg of PROXEL (product name, produced by ICI Co., Ltd.) as an anti-septic agent were added. The emulsion which was finally obtained was a silver iodochlorobromide cubic particle emulsion which included 0.08 mol % of silver iodide and where the ratio of silver chlorobromide was 70 mol % of silver chloride and 30 mol % of silver bromide, the average particle diameter was 0.22 μm, and the coefficient of variation was 9%.

(Production of Composition for Forming Photosensitive Layer)

A composition for forming a photosensitive layer was obtained by adding $1.2 \times 10^{-4}$ mol/molAg of 1,3,3a,7-tetraazaindene, $1.2 \times 10^{-2}$ mol/molAg of hydroquinone, $3.0 \times 10^{-4}$ mol/molAg of citric acid, and 0.90 g/molAg of 2,4-dichloro-6-hydroxy-1,3,5-triazine sodium salt to the emulsion described above and adjusting the coating liquid pH to 5.6 using citric acid.

(Photosensitive Layer Forming Step)

After carrying out a corona discharge treatment on a polyethylene terephthalate (PET) film with a thickness of 100 μm, a gelatin layer with a thickness of 0.1 μm as an undercoat layer and also an antihalation layer of which the optical density was approximately 1.0 and which included a dye which was decolorized by an alkali developer on the undercoat layer were provided on both surfaces of the PET film described above. A PET film where a photosensitive layer was formed on both surfaces was obtained by coating the composition for forming a photosensitive layer on the antihalation layer described above and further providing a gelatin layer with a thickness of 0.15 μm. The obtained film is a film A. The formed photosensitive layer had a silver content of 6.0 g/m² and a gelatin content of 1.0 g/m².

(Exposing and Developing Step)

Exposure was performed using parallel light which used a high pressure mercury lamp as light source via a photo mask on which detection electrodes (the first detection electrodes and the second detection electrodes) and lead-out wires (the first lead-out wires and the second lead-out wires) were arranged as shown in FIG. 6 on both surfaces of the film A described above. After the exposure, the developing was carried out using a developer and a developing process was further performed using a fixing liquid (product name: N3X-R for CN16X, produced by Fujifilm Corporation). Furthermore, a capacitance-type touch panel sensor A comprising detection electrodes and lead-out wires consisting of Ag thin wires on both surfaces was obtained by rinsing with pure water and drying.

Here, in the obtained capacitance-type touch panel sensor A, the detection electrodes are formed by conductive thin wires which intersect in a mesh form. In addition, as described above, the first detection electrodes are electrodes which extend in the X direction and the second detection electrodes are electrodes which extend in the Y direction and each is arranged on a film at a pitch of 4.5 mm to 5 mm.

Next, a touch panel including a liquid crystal display device, a lower pressure-sensitive adhesive layer, a capacitance-type touch panel sensor, an upper pressure-sensitive adhesive layer, and a glass substrate in this order was manufactured using the pressure-sensitive adhesive films produced in the respective examples and comparative examples. Here, the capacitance-type touch panel sensor A manufactured above was used as the capacitance-type touch panel sensor.

As a manufacturing method of the touch panel, one peeling film of the above pressure-sensitive adhesive films is peeled off, the above pressure-sensitive adhesive layer is bonded onto a capacitance-type touch panel sensor using a 2 kg heavy roller to produce the upper pressure-sensitive adhesive layer, then the other peeling film was peeled off, and a glass substrate of the same size was bonded onto the upper pressure-sensitive adhesive layer using a 2 kg heavy roller in a similar manner. Thereafter, a defoaming treatment was carried out thereon in a high-pressure constant-temperature tank by exposure to an environment of 40° C. and 5 atm for 20 minutes.

Next, by the same procedure for the production of the upper pressure-sensitive adhesive layer using the pressure-sensitive adhesive film used in the production of the upper pressure-sensitive adhesive layer, a lower pressure-sensitive adhesive layer was arranged between the capacitance-type touch panel sensor with a structure in which the glass substrate, the upper pressure-sensitive adhesive layer, and the capacitance-type touch panel sensor were bonded in order, and the liquid crystal display device, so as to bond the two together.

Thereafter, the touch panel obtained as described above was exposed to an environment of 40° C. and 5 atm for 20 minutes in a high-pressure constant-temperature tank to manufacture a predetermined touch panel.

As the lower pressure-sensitive adhesive layer and the upper pressure-sensitive adhesive layer in the touch panel, the pressure-sensitive adhesive layers in the respective examples and the comparative examples are used.

In each example and comparative example, the size of the display screen of the liquid crystal display device (the length of the diagonal) and the length of the diagonal of the touch part (sensing portion) in the capacitance-type touch panel sensor were 5 inches.

The temperature of the touch panel produced above was gradually increased from −10° C. to 40° C. by 10° C. stepwise and the malfunction occurrence rate of at the time of touch at each temperature was measured. That is, touching was carried out 100 times at arbitrary place on a glass substrate forming a touch surface in environments of −10° C., 0° C., 10° C., 20° C., 30° C., and 40° C., and the malfunction occurrence rate (%) of the touch panel [(number of times where a normal reaction did not occur/100)×100] was measured from the number of cases where a normal reaction did not occur.

The maximum value was calculated from the malfunction occurrence rate at each measured temperature and a case where the value was 5% or less was evaluated as OK and in a case where the value was over 5% was evaluated as NG.

(Operability Evaluation Method)

After leaving the touch panel produced above in an environment of 20° C. for 24 hours, the touch surface on the protective substrate of the touch panel was touched with a finger in an environment of 20° C., the operability was confirmed by four human subjects, the scores were ranked by sensory evaluation on the following criteria, and the average value was rounded up to be the evaluation point.

"5": The touch operation could be recognized well
"4": The touch operation could be recognized
"3": The touch operation is recognizable although slightly delayed in operation
"2": The operation is slow and there is a problem in practical use.
"1": The operation is very slow and there is a problem in practical use.

<<Evaluation Results>>

The results of the various evaluation tests described above are shown in Table 2.

TABLE 2

| | High dielectric constant layer A | | | | | Low dielectric constant layer B | | |
| --- | --- | --- | --- | --- | --- | --- | --- | --- |
| Second Table | Type of pressure-sensitive adhesive agent composition | Relative dielectric constant at 20° C. | Temperature dependency | Glass transition temperature (Tg) | Temperature at which maximum value of relative dielectric constant (° C.) exists | Type of pressure-sensitive adhesive agent composition | Relative dielectric constant at 20° C. | Temperature dependency |
| Example 1 | A | 4.8 | 13% | −25° C. | −12° C. | — | — | — |
| Example 2 | B | 6.9 | 16% | −15° C. | −5° C. | — | — | — |
| Example 3 | C | 7.8 | 22% | 1° C. | 5° C. | — | — | — |
| Example 4 | B | 6.4 | 13% | −8° C. | −3° C. | — | — | — |
| Example 5 | B | 6.9 | 16% | −15° C. | −5° C. | a | 3.7 | 12% |
| Example 6 | B | 6.9 | 16% | −15° C. | −5° C. | b | 3.9 | 18% |
| Example 7 | B | 6.9 | 16% | −15° C. | −5° C. | G | 3.5 | 7% |
| Example 8 | B | 6.9 | 16% | −15° C. | −5° C. | a | 3.7 | 12% |

TABLE 2-continued

| | | | | | | | | |
|---|---|---|---|---|---|---|---|---|
| Example 9 | B | 6.9 | 16% | −15° C. | −5° C. | a | 3.7 | 12% |
| Example 10 | B | 6.9 | 16% | −15° C. | −5° C. | a | 3.7 | 12% |
| Example 11 | B | 6.9 | 16% | −15° C. | −5° C. | a | 3.7 | 12% |
| Example 12 | B | 6.9 | 16% | −15° C. | −5° C. | a | 3.7 | 12% |
| Example 13 | E | 5.3 | 14% | −21° C. | −10° C. | a | 3.7 | 12% |
| Example 14 | F | 5.8 | 15% | −18° C. | −8° C. | a | 3.7 | 12% |
| Example 15 | C | 7.8 | 22% | 1° C. | 5° C. | a | 3.7 | 12% |
| Comparative Example 1 | X | 4.8 | 38% | 25° C. | — | — | — | — |
| Comparative Example 2 | Y | 3 | 18% | 19° C. | — | — | — | — |

| | Pressure-sensitive adhesive layer (pressure-sensitive adhesive sheet) overall | | | | | |
|---|---|---|---|---|---|---|
| Second Table | Film thickness ratio (Low dielectric constant layer B/High dielectric constant layer A) | Relative dielectric constant at 20° C. | Temperature dependency | Pressure-sensitive adhesive strength (N/mm) | Malfunction occurrence rate | Operability |
| Example 1 | — | 4.8 | 13% | 0.21 | 2% | 3 |
| Example 2 | — | 6.9 | 16% | 0.23 | 2% | 5 |
| Example 3 | — | 7.8 | 22% | 0.32 | 5% | 5 |
| Example 4 | — | 6.4 | 13% | 0.25 | 2% | 5 |
| Example 5 | 0.13 | 6.2 | 15% | 0.48 | 2% | 5 |
| Example 6 | 0.13 | 6.1 | 17% | 0.51 | 2% | 5 |
| Example 7 | 0.13 | 6 | 10% | 0.56 | 1% | 4 |
| Example 8 | 0.75 | 5.7 | 12% | 0.71 | 1% | 4 |
| Example 9 | 0.46 | 5.9 | 13% | 0.69 | 2% | 5 |
| Example 10 | 0.24 | 6.1 | 15% | 0.58 | 2% | 5 |
| Example 11 | 0.07 | 6.7 | 16% | 0.39 | 2% | 5 |
| Example 12 | 0.03 | 6.9 | 16% | 0.28 | 2% | 5 |
| Example 13 | 0.13 | 5.1 | 13% | 0.49 | 2% | 5 |
| Example 14 | 0.13 | 5.5 | 14% | 0.51 | 2% | 5 |
| Example 15 | 0.13 | 7.1 | 18% | 0.49 | 4% | 5 |
| Comparative Example 1 | — | 4.8 | 38% | 0.47 | 10% | 4 |
| Comparative Example 2 | — | 3 | 18% | 0.51 | <1% | 2 |

As shown in Table 2, by using a pressure-sensitive adhesive layer (pressure-sensitive adhesive sheet) having a specific relative dielectric constant, a temperature dependency, and a 180 degree peel strength, the operability of the touch panel is excellent and it is possible to suppress the occurrence of malfunction of the touch panel in a wide range of temperature environments from a low temperature to a high temperature, and it was also shown that the pressure-sensitive adhesion was excellent (Examples).

From the comparison between Example 2 and Examples 5 to 12, it was found that by using the pressure-sensitive adhesive sheets (Examples 5 to 12) which is a laminated structure in which the low dielectric constant layer is provided on both surfaces of the high dielectric constant layer, more excellent pressure-sensitive adhesion was exhibited.

According to Examples 5 to 12, by setting the ratio of the film thickness of the low dielectric constant layer to the film thickness of the high dielectric constant layer within the specific range (0.05 to 0.5), it was shown that it is possible to satisfy both performances of operability and adhesion at a high level.

From the comparison between Example 5 and Example 15, in a case where a pressure-sensitive adhesive sheet which is a laminated structure in which a low dielectric constant layer is provided on both surfaces of a high dielectric constant layer is used, it was shown that, by using a pressure-sensitive adhesive sheet having a high dielectric constant layer having a low Tg, it is possible to lower the temperature dependency and further suppress the occurrence of malfunctions.

On the other hand, according to Comparative Example 1, it was shown that, when the temperature dependency of the pressure-sensitive adhesive sheet is high, malfunctions of the touch panel were likely to occur.

In addition, according to Comparative Example 2, it was shown that, when the relative dielectric constant of the pressure-sensitive adhesive sheet is low, the operability of the touch panel deteriorates.

EXPLANATION OF REFERENCES

12: pressure-sensitive adhesive sheet
18, 180, 180a, 280, 380: capacitance-type touch panel sensor
20: protective substrate
22: substrate
24, 24a: first detection electrode
26, 26a: first lead-out wiring
28, 28a: second detection electrode
30: second lead-out wiring
32: flexible printed wiring board
34: conductive thin wire
36: grid
38: first substrate
40: pressure-sensitive adhesive sheet 42: second substrate
100: aluminum electrode
200, 300: touch panel laminate
400, 500: capacitance-type touch panel

What is claimed is:

1. A pressure-sensitive adhesive sheet for a touch panel, wherein a relative dielectric constant obtained by impedance measurement at 1 MHz at 20° C. is 4.0 or more, a temperature dependency obtained from a temperature dependency evaluation test is 25% or less, and a 180 degree peel strength with respect to glass is 0.2 to 1.2 N/mm, wherein the temperature dependency evaluation test comprises interposing a pressure-sensitive adhesive sheet for a touch panel between aluminum electrodes while a temperature is raised from −10° C. to 40° C. at intervals of 10° C., the relative dielectric constant of the pressure-sensitive adhesive sheet is calculated using impedance measurement at 1 MHz at each temperature at intervals, and the minimum value and the maximum value are selected from the relative dielectric constant calculated at each temperature at intervals, and a value obtained from the expression [{(maximum value−minimum value)/minimum value}×100] (%) is taken as the temperature dependency, wherein the pressure-sensitive adhesive sheet comprising:
a first layer having a relative dielectric constant determined by impedance measurement at 1 MHz at 20° C. of 4.0 or more and a temperature dependency A of 25% or less; and
a second layer having a relative dielectric constant determined by impedance measurement at 1 MHz at 20° C. of 4.0 or less and a temperature dependency B of 20% or less,
wherein the second layer is provided on both surfaces of the first layer, and
the relative dielectric constant of the first layer at 20° C. is higher than the relative dielectric constant of the second layer at 20° C.

2. The pressure-sensitive adhesive sheet for a touch panel according to claim 1,
wherein the temperature dependency is 20% or less.

3. The pressure-sensitive adhesive sheet for a touch panel according to claim 1,
wherein a ratio of a thickness of the second layer with respect to a thickness of the first layer is 0.05 to 0.5.

4. The pressure-sensitive adhesive sheet for a touch panel according to claim 1,
wherein a glass transition temperature of the first layer is 0° C. or less.

5. The pressure-sensitive adhesive sheet for a touch panel according to claim 1,
wherein, in the temperature dependency evaluation test, in a case where the first layer is used instead of the pressure-sensitive adhesive sheet for a touch panel, a maximum value of the relative dielectric constant of the first layer is in a range of −10° C. to 40° C.

6. The pressure-sensitive adhesive sheet for a touch panel according to claim 1,
wherein the first layer includes a (meth)acrylic resin and the (meth)acrylic resin has a repeating unit derived from a monomer having at least one group selected from a group consisting of a hydroxyl group, a nitrogen-containing functional group, and a carboxyl group, and the monomer is used in an amount of 10% by mass or more with respect to 100% by mass of the monomer total mass used for polymerization of the (meth)acrylic resin.

7. The pressure-sensitive adhesive sheet for a touch panel according to claim 1,
wherein the second layer includes a (meth)acrylic resin and a hydrophobic compound.

8. The pressure-sensitive adhesive sheet for a touch panel according to claim 7,
wherein the hydrophobic compound included in the second layer includes at least one resin selected from a group consisting of a terpene-based resin, a rosin-based resin, a coumarone indene-based resin, a rubber-based resin, and a styrene-based resin.

9. The pressure-sensitive adhesive sheet for a touch panel according to claim 7,
wherein a content of the hydrophobic compound is 20% to 80% by mass with respect to the second layer total mass, and is 1% to 30% by mass with respect to the pressure-sensitive adhesive sheet for a touch panel total mass.

10. A laminate for a touch panel comprising:
the pressure-sensitive adhesive sheet for a touch panel according to claim 1; and
a capacitance-type touch panel sensor.

11. The laminate for a touch panel according to claim 10, further comprising:
a protective substrate,
wherein the capacitance-type touch panel sensor, the pressure-sensitive adhesive sheet for a touch panel, and the protective substrate are in this order.

12. A capacitance-type touch panel comprising at least:
a display device;
the pressure-sensitive adhesive sheet for a touch panel according to claim 1; and
a capacitance-type touch panel sensor, in this order.

13. The pressure-sensitive adhesive sheet for a touch panel according to claim 2,
wherein a ratio of a thickness of the second layer with respect to a thickness of the first layer is 0.05 to 0.5.

14. The pressure-sensitive adhesive sheet for a touch panel according to claim 2,
wherein a glass transition temperature of the first layer is 0° C. or less.

15. The pressure-sensitive adhesive sheet for a touch panel according to claim 3,
wherein a glass transition temperature of the first layer is 0° C. or less.

16. The pressure-sensitive adhesive sheet for a touch panel according to claim 2,
wherein, in the temperature dependency evaluation test, in a case where the first layer is used instead of the pressure-sensitive adhesive sheet for a touch panel, a maximum value of the relative dielectric constant of the first layer is in a range of −10° C. to 40° C.

17. The pressure-sensitive adhesive sheet for a touch panel according to claim 3,
wherein, in the temperature dependency evaluation test, in a case where the first layer is used instead of the pressure-sensitive adhesive sheet for a touch panel, a maximum value of the relative dielectric constant of the first layer is in a range of −10° C. to 40° C.

18. The pressure-sensitive adhesive sheet for a touch panel according to claim 4,
wherein, in the temperature dependency evaluation test, in a case where the first layer is used instead of the pressure-sensitive adhesive sheet for a touch panel, a maximum value of the relative dielectric constant of the first layer is in a range of 10° C. to 40° C.

* * * * *